US012139030B1

(12) United States Patent
Booth et al.

(10) Patent No.: US 12,139,030 B1
(45) Date of Patent: Nov. 12, 2024

(54) LIFT MECHANISM FOR ALIGNING CHARGING ELEMENTS TO CHARGE VEHICLE

(71) Applicant: Zoox, Inc., Foster City, CA (US)

(72) Inventors: Bryan Emrys Booth, San Francisco, CA (US); Vamsi Krishna Pathipati, San Carlos, CA (US); Thomas Andrew Stoddart, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 515 days.

(21) Appl. No.: 17/399,680

(22) Filed: Aug. 11, 2021

(51) Int. Cl.
| | |
|---|---|
| *H02J 50/90* | (2016.01) |
| *B60L 53/12* | (2019.01) |
| *B60L 53/38* | (2019.01) |
| *B60L 53/65* | (2019.01) |
| *H02J 7/00* | (2006.01) |
| *H02J 50/00* | (2016.01) |
| *H02J 50/10* | (2016.01) |
| *H02J 50/40* | (2016.01) |

(52) U.S. Cl.
CPC .............. *B60L 53/38* (2019.02); *B60L 53/12* (2019.02); *B60L 53/65* (2019.02); *H02J 7/0042* (2013.01); *H02J 50/005* (2020.01); *H02J 50/10* (2016.02); *H02J 50/90* (2016.02); *H02J 50/402* (2020.01)

(58) Field of Classification Search
CPC ...................................................... H02J 50/90
USPC ........................................................ 320/108
See application file for complete search history.

(56) References Cited

U.S. PATENT DOCUMENTS

| | | | |
|---|---|---|---|
| 5,478,249 A | 12/1995 | Crestin | |
| 6,783,199 B2 | 8/2004 | Parrott | |
| 8,138,718 B2 | 3/2012 | Dower | |
| 9,527,403 B2 | 12/2016 | Mardall et al. | |
| 9,660,487 B1 * | 5/2017 | Mu ....................... | B60L 53/126 |
| 10,661,669 B1 | 5/2020 | Torok et al. | |
| 2002/0124906 A1 | 9/2002 | Suzuki et al. | |

(Continued)

FOREIGN PATENT DOCUMENTS

| | | |
|---|---|---|
| CN | 107302153 | 10/2017 |
| CN | 107719173 | 2/2018 |

(Continued)

OTHER PUBLICATIONS

Office action for U.S. Appl. No. 16/214,826, mailed on Jan. 7, 2021, Boecker, "Charge Coupler and Method for Autonomously Charging Vehicle Batteries", 8 pages.

(Continued)

*Primary Examiner* — Edward Tso
*Assistant Examiner* — Ahmed H Omar
(74) *Attorney, Agent, or Firm* — Lee & Hayes, P.C.

(57) ABSTRACT

A charging system includes one or more inductive charging elements arranged in a charging space. A lift mechanism, such as a lever arm, is configured to lift the charging elements into position for transferring current to vehicle charging elements. Sensor(s) may detect a location of the charging element relative to the vehicle charging element, and adjustments may be made to align the charging element and the vehicle charging element (passively and/or actively). The sensor(s) may also determine characteristic(s) of the vehicle, such as ground clearance, make/model, etc. to align the charging element and the vehicle charging element and/or to control power transfer to the vehicle.

20 Claims, 6 Drawing Sheets

(56) References Cited

U.S. PATENT DOCUMENTS

| | | | |
|---|---|---|---|
| 2005/0232647 A1* | 10/2005 | Takenaka | H02J 50/90 399/27 |
| 2006/0053631 A1 | 3/2006 | Fossella | |
| 2010/0201309 A1 | 8/2010 | Meek | |
| 2011/0133692 A1* | 6/2011 | Shimoyama | B60L 53/126 320/108 |
| 2011/0302078 A1 | 12/2011 | Failing | |
| 2012/0025761 A1 | 2/2012 | Takada et al. | |
| 2012/0029750 A1 | 2/2012 | Ortmann et al. | |
| 2013/0012044 A1 | 1/2013 | Maurer et al. | |
| 2013/0175987 A1 | 7/2013 | Amma et al. | |
| 2014/0043740 A1 | 2/2014 | Richardson et al. | |
| 2014/0095026 A1 | 4/2014 | Freitag et al. | |
| 2015/0239352 A1* | 8/2015 | Bell | B60L 53/30 320/108 |
| 2015/0270734 A1 | 9/2015 | Davison et al. | |
| 2015/0360577 A1 | 12/2015 | Greenwood et al. | |
| 2016/0023565 A1 | 1/2016 | Bell et al. | |
| 2016/0052414 A1* | 2/2016 | Bell | G01L 5/0038 320/108 |
| 2016/0288656 A1 | 10/2016 | Kristof et al. | |
| 2017/0096073 A1 | 4/2017 | Mardall et al. | |
| 2017/0106762 A1 | 4/2017 | Dow et al. | |
| 2017/0225582 A1 | 8/2017 | Augst et al. | |
| 2018/0264963 A1 | 9/2018 | Dudar | |
| 2019/0023139 A1* | 1/2019 | Wechsler | B60L 53/39 |
| 2019/0023141 A1 | 1/2019 | Huang et al. | |
| 2019/0073072 A1 | 3/2019 | Van Der Werff et al. | |
| 2019/0176633 A1 | 6/2019 | Booth et al. | |
| 2019/0176637 A1 | 6/2019 | Booth et al. | |
| 2020/0180448 A1 | 6/2020 | Boecker et al. | |
| 2020/0406767 A1 | 12/2020 | Booth et al. | |

FOREIGN PATENT DOCUMENTS

| | | |
|---|---|---|
| EP | 3070810 A1 | 9/2016 |
| WO | WO2010003021 A2 | 1/2010 |

OTHER PUBLICATIONS

Non Final Office Action dated Sep. 10, 2020 for U.S. Appl. No. 15/837,820, "Underbody Charging of Vehicle Batteries", Booth, 17 pages.

Final Office Action dated Dec. 20, 2019 for U.S. Appl. No. 15/837,862 "Underbody Charging of Vehicle Batteries" Booth, 8 pages.

Final Office Action dated Apr. 6, 2020 for U.S. Appl. No. 15/837,820 "Underbody Charging of Vehicle Batteries" Booth, 18 pages.

Office action for U.S. Appl. No. 15/837,862, mailed on Jun. 27, 2019, Booth, "Underbody Charging of Vehicle Batteries", 9 pages.

Office action for U.S. Appl. No. 15/837,820, mailed on Aug. 7, 2019, Booth, "Underbody Charging of Vehicle Batteries", 14 pages.

The PCT Search Report and Written Opinion mailed on Mar. 14, 2019 for PCT Application No. PCT/US2018/064752, 14 pages.

The PCT Search Report and Written Opinion mailed on Feb. 10, 2020 for PCT Application No. PCT/US2019/064611, 13 pages.

\* cited by examiner

LIFT MECHANISM FOR ALIGNING CHARGING ELEMENTS TO CHARGE VEHICLE

BACKGROUND

Electric and hybrid vehicles rely on rechargeable batteries to supply electrical power to various components, such as electric motors. Batteries may be recharged using various technologies, including contact-based solutions using plugs or other physical electrical contacts and/or contactless-based solutions (e.g., inductive charging). In some instances, contactless-based solutions may provide advantages over contact-based technologies. For example, contactless-based solutions may eliminate plugging/unplugging connections that contributes to additional maintenance (e.g., pin wear), safety risks, and opportunities for user error. Contactless-based solutions may also be more convenient.

However, some conventional contactless-based solutions may be complicated and/or require additional components. For example, in inductive charging, a charging coil located offboard the vehicle may be aligned with a vehicle coil located onboard the vehicle. In such instances, the coils are required to be aligned and spaced relative to each other within relatively tight tolerances in order to efficiently transfer power.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
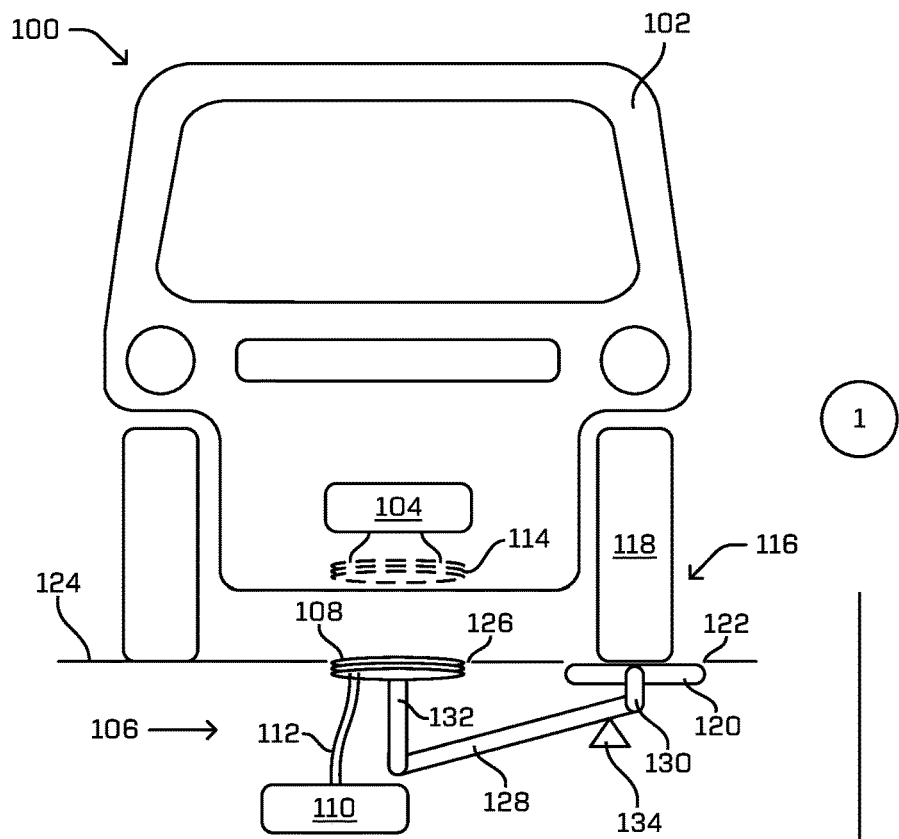
FIG. 1 illustrates an example charging system for charging a battery of a vehicle, according to an example of the present disclosure. In some instances, the charging system may include charging elements that are brought into proximity with vehicle charging elements by a passive lift mechanism.
Figure 1:
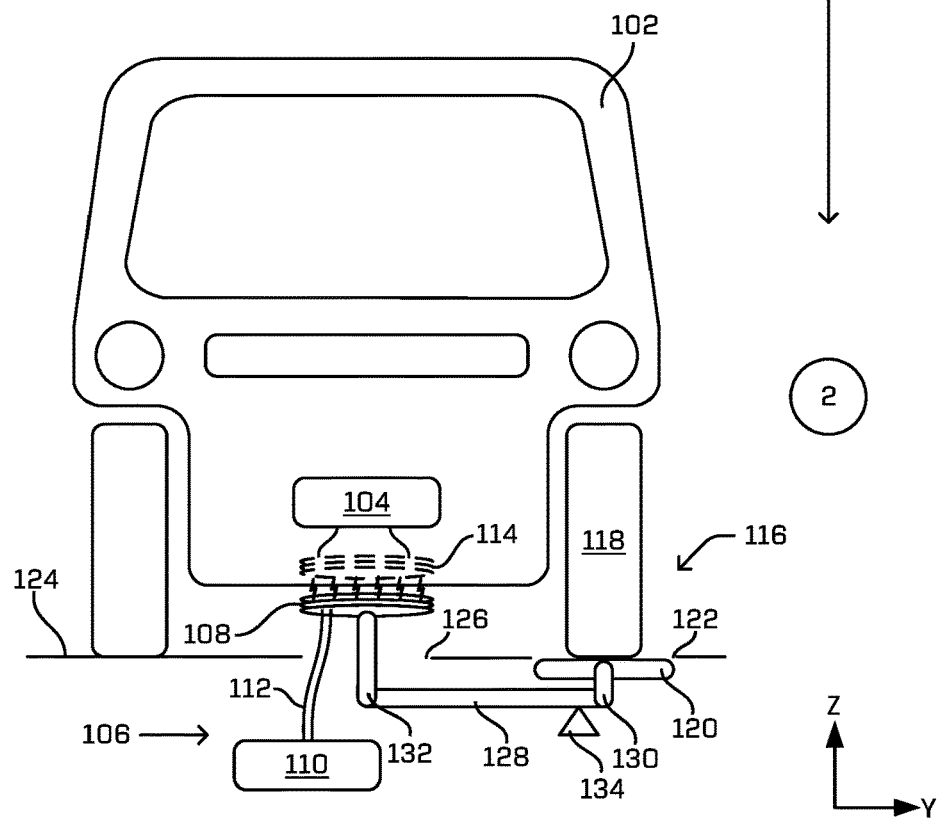

This disclosure relates to systems and methods for charging a battery of a vehicle. In some instances, the systems and methods may include contactless-based charging that transfers power by contactless technologies, such as inductive charging. For example, a charging system may include one or more charging element, such as charging coils (or primary coils), arranged in a vehicle charging space, as well as one or more vehicle charging elements, such as vehicle coils (or secondary coils), secured to a vehicle (e.g., undercarriage). The charging coils and the vehicle coils may be aligned to wirelessly transfer power to the vehicle for charging batteries located onboard the vehicle. In some instances, during charging, the charging coils may be positioned proximate the vehicle coils for transferring power. For example, within the charging space, a passive or active lift mechanism may raise the charging coils into position and alignment with the vehicle coils. In some instances, the lift mechanism may be actuated via a tire of the vehicle engaging the lift mechanism, such as a lever arm, that raises the charging coils. Additionally, or alternatively, a switch or other sensor may sense that the vehicle is present and raise the charging coils. Once raised, the charging coils may be located proximate to the vehicle coils to enable efficient transfer of power. When charging is completed, the lift mechanism lower and the charging coils are retracted. In some instances, the charging system may include alignment mechanisms that align the charging coils laterally and/or longitudinally with the vehicle coils. For example, based at least in part on a location of the charging coils relative to the vehicle coils, and adjustments may be made to properly align the charging coils and the vehicle coils. In some instances, sensor(s) may be used to determine characteristic(s) of the vehicle, such as position, ground clearance, make/model, and so forth to properly align the charging coils and the vehicle coils, as well as to adjust and control an amount of power transferred to the vehicle.

As indicated above, one or more offboard inductive charging coils (also referred to as charging coils, offboard coils, primary coils, primary charging elements, or charging elements) may be arranged in the vehicle charging space. The vehicle charging space may include a drivable surface (e.g., asphalt, concrete, gravel, metal, pavement, etc.) on which the vehicle may maneuver or traverse. The charging coil(s) may rest atop and/or be recessed in or below the drivable surface. For example, the vehicle may arrive at the charging station to charge batteries located onboard the vehicle. As the vehicle arrives at the charging station, the vehicle may drive over the top of the charging coils. Once the vehicle is positioned at least partially over the charging coils, the lift mechanism may transition from a retracted state (or first position) to an extended state (or second position) for bringing the charging coils into proximity with the vehicle inductive charging coils (also referred to as vehicle coils, onboard coils, secondary coils, vehicle elements, vehicle charging elements) to transfer power to the vehicle (e.g., via induction). In other words, the charging coils are initially spaced apart from the vehicle coils (e.g., to enable the vehicle to pass over top of the charging coils without interference with the chassis or drive train of the vehicle), but as the lift mechanism is actuated, the charging coils are elevated or otherwise brought into closer proximity to the vehicle coils. The close proximity permits the charging coils to more efficiently transfer power to the vehicle coils. As such, in some instances, the charging station is configured to wirelessly charge the vehicle. The charging coils are coupled (e.g., via wires, cables, busses, traces, or other electrical connections) to a power source, where the power source may receive direct current (DC) and/or alternating current (AC). The charging coils receive AC from the power source for inducing AC in the vehicle coils. The vehicle includes power electronics coupled to the vehicle coils that are configured to convert the induced AC to DC for charging batteries of the vehicle. In some instance, a charging coil may be configured to deliver 50 kW-100 KW of power to the vehicle. However, in other examples the charging coil may be configured to deliver more or less power to the vehicle.

The charging coils are raised to minimize a gap between the charging coils and the vehicle coils. In the raised position, the gap between the charging coil(s) and the vehicle coil(s) can be between 0 and 20 centimeters. In some examples, in the raised position, the gap may be less than 10 centimeters, less than 5 centimeters, or the charging coil(s) (or a housing, coating, or enclosure thereof) may be brought into physical contact with the vehicle coil(s) (or a housing, coating, or enclosure thereof). By minimizing the gap, power can be transmitted more efficiently with less heat generation and, consequently, a required size of the charging coils and/or the vehicle coils can be minimized. The gap may also enable high speed charging of the vehicle (e.g., 40 kW or more). Additional gaps are completed, however, depending on the vehicle to be charged. For example, in some instances, the gap may be based at least in part on characteristic(s) of the charging coil(s) and/or the vehicle coil(s) (e.g., diameter).

In a simple example, the lift mechanism represents a lever arm that actuates to raise the charging coils in a direction towards the vehicle coils. One end of the lever arm may couple to a plate on which the tire of the vehicle rests. As the vehicle enters the charging station, the vehicle may drive onto the plate. The weight of the vehicle is applied to the plate and causes the first end of the lever arm to lower. Simultaneously, a second end of the lever arm is raised under the weight of the vehicle. The charging coils are located on the second end such that as the vehicle drives onto the plate, the charging coils are raised into proximity with the vehicle coils. In some instances, the plate may include a channel, (e.g., trough) within which a tire of the vehicle rests (e.g., cradled) to secure and resist movement of the vehicle during charging.

The lever arm may pivot about a fulcrum such that movement of the first end of the lever arm in a first direction causes the second end of lever arm to move in a second opposite direction. In some instances, the fulcrum may be variably positioned along a length of the lever arm to adjust a lift height of the charging coils. The variable adjustment may also adjust a weight required to lift the vehicle coils. More generally, the lever arm may be associated with a lever arm ratio such that a lowering of the first end of the lever arm by a first amount raises the second end of the lever arm by a second amount. For example, if the first end lowers by one inch, the second end may raise by ten inches (e.g., 10:1 lever arm ratio). While the lift mechanism in this example includes a single lever arm, in other examples, the lift mechanism may include additional lever arms, linkages, gears, and/or other components to transfer a weight or other force applied by the vehicle to a force to lift or otherwise move one or more charge coils into closer proximity to one or more vehicle coils. In some instances, the fulcrum position may be calibrated to provide the necessary height for vehicles of different weights (e.g., semitrucks versus sedans). Here, for example, heavier vehicles may have a higher ground clearance and require a higher lift to bring the charging coils into proximity with the vehicle coils. By adjusting the position of the fulcrum along the lever arm (e.g., via actuators), an amount of weight required to lift the charging coils may vary, and/or a lift height of the charging coils may vary based on the weight of the vehicle.

In some instances, dampener(s) may assist in raising and lowering the charging coils. The dampener(s) may be used to resist motion of the lift mechanism to gradually raise the charging coils into position after the vehicle arrives at the charging station and drives onto the plate. The dampener(s) may also gradually lower the charging coils after charging. The use of the dampener(s) may ensure that the vehicle is in position before raising the charging coil, which may prevent damage to the charging coils and/or the underside of the vehicle. Gradually lowering the charging coils may also prevent damage to the charging coils after charging. Springs may additionally or alternatively be used to adjust a weight required to lift the charging coils. For example, the springs may transfer forces to the lever arm after the springs have been compressed. Different or variable spring constants may be used to adjust the amount of force required to compress the spring. In some instances, the different or variable spring constants may be associated with the lift height. Other passive pneumatics or hydraulic may also actuate to adjust the amount of force required to lift the charging coils and/or may delay lifting and/or lowering of the charging coils. Additionally, other lift mechanisms may be used for raising and lowering the charging coils, such as those discussed in U.S. patent application Ser. No. 16/214,826, filed Dec. 10, 2018, the entirety of which is herein incorporated by reference.

In some instances, a locking mechanism may be used to lock the lift mechanism in the lowered position and/or the raised position. For instance, the locking mechanism may lock the lift mechanism in the lowered position as the vehicle drives over the charging coil until the vehicle is in correct position for charging, at which point the locking mechanism may release to allow the lift mechanism to transition from the lowered position to the raised position in which the charging coils are positioned proximate the vehicle coils. In some instances, the locking mechanism may comprise a pin, latch, or other member and may be mechanically actuated (e.g., by the vehicle or a component of the vehicle such as the tire or bumper contacting a release switch), electrically actuated (e.g., by activation of a solenoid switch or electric motor), or other actuation mechanism (e.g., by application of a hydraulic, pneumatic, magnetic, or other motive force to release the locking mechanism).

In some instances, instead of or in addition to the lever arm to raise the charging coils, the lift mechanism may additionally or alternatively include actuator(s) (e.g., hydraulic, pneumatic, electro-mechanical, etc.) that actuate to position the charging coils. For example, the charging coil(s) may be coupled to actuators that lift the charging coil(s) adjacent to the vehicle coil(s). As the vehicle enters the charging station, the actuators may lift the charging coils into place, and once the vehicle is charged, the actuators may retract the charging coils. In some instances, sensor(s) may detect whether a vehicle is at the charging station. For example, a sensor may be disposed on a pad onto which the tire of the vehicle rests. Here, the sensor(s) may detect a weight of the vehicle for use in raising the charging coil(s). For example, as a result of sensing the vehicle, the actuator(s) may actuate to raise the charging coils. In some instances, the amount by which the charging coil(s) are raised may be based on the weight of the vehicle. Once the charging coils are in position, power is transferred to the vehicle. In some instances, the actuator(s) may position the charging coil(s) longitudinally and/or laterally, relative to the vehicle, to align the charging coil(s) with the vehicle coil(s). Additionally, the actuator(s) may orient (e.g., tilt, rotate, etc.) the charging coil(s) to properly align the charging coil(s) relative to the vehicle coil(s).

Sensors may also be used to control an actuation of the actuator(s) upon arrival of the vehicle at the charging station. Such sensor(s) may assist in the alignment of the charging coils. Example sensor(s) include proximity sensor(s), imaging sensor(s), radar, lidar, and so forth. The sensor(s) may detect a position of the charging coil(s) relative to the vehicle coil(s). Such detection may assist in providing feedback to adjust the position of the charging coil(s) for transferring power to the vehicle (e.g., using the actuator(s)). For example, using feedback from the sensor(s), the actuator(s) may extend or retract to adjust the position and/or orientation of the charging coil(s). Fiducials, or other markers, may be imaged for knowing the position and/or orientation of the charging coil(s) and/or vehicle coil(s). As such, by properly aligning the charging coil(s) and the vehicle coil(s), power may be efficiently transferred to the vehicle.

The sensor(s), or additional sensor(s), may also be utilized to determine characteristic(s) of the vehicle, such as make, model, ground clearance, geometry, track width, and so forth. For example, imaging sensor(s) may image the vehicle for determining make and model. Based on the make and model, the actuator(s) may position the charging coils at a respective location. In other words, for different vehicles, the charging coil(s) may be located in different positions and/or at different distances from a ground surface. Knowing the make and model, for example, allows for the location of the vehicle coil(s) to be determined, which in turn, allows for the charging coil(s) to be raised by a respective amount. In this respect, the charging coils may be configured to charge various vehicles (e.g., a fleet of vehicles) having various sizes and/or power systems. For example, a variety of different vehicle charging spaces may be arranged in a charging depot for charging a variety of different vehicles (e.g., scooters, autonomous delivery bots/vehicles, single-person vehicles, multi-passenger vehicles vans, busses, trucks, etc.). In some instances, such information may be transferred from the vehicle to the charging system via one or more of a radio frequency identifier (RFID) on the vehicle, over a wireless protocol (e.g., Wi-Fi, Bluetooth, Near Field Communication (NFC), etc.), or otherwise.

In some instances, the sensor(s) may also measure an induced electromagnet field (EMF) between the charging coils and the vehicle coils. For example, a magnetometer or electromagnetic sensor may measure an induced EMF and based on the EMF, the charging coils may be retracted. This means that when the EMF is below a certain threshold, for example, such that current is no longer being induced from the charging coils to the vehicle coils (or the current is smaller than a threshold), the batteries may be charged (or the vehicle may no longer be present, etc.). In such instances, the lift mechanism may be retracted for lowering the charging coils from the vehicle (or otherwise the extended position). The sensor(s) may provide redundant indications of such via RFID, NFC, Wi-Fi, camera, etc.

In some instances, alignment may be accomplished manually, without sensors, based on the position of the vehicle wheels relative to the lift mechanism. For example, when the vehicle enters the charging space, a side of the wheel (or tire) may engage a bumper or other stop to physically push the lift mechanism side to side. This sideways movement may laterally align the charging coils with the vehicle coils. In such instances, the lift mechanism may be disposed on slides or other moveable-type channels for laterally translating the lift mechanism to align the vehicle coil(s) and the charging coil(s). Therein, once the wheel engages the lift mechanism, the lift mechanism may raise the charging coils into position.

Although discussed herein the context of autonomous vehicles, the system and methods described herein may be applied to a variety of components for charging batteries and are not limited to autonomous vehicles. For instance, the techniques described herein may be utilized in driver-controlled vehicles electric vehicles. Additionally, or alternatively, the techniques may be utilized in connection with charging batteries of land vehicles, watercraft, aircraft, robots, computing devices, or any other battery powered device. In some instances, rather than finding use in contactless charging, the systems and methods discussed herein may be applied to contact-based charging (e.g., conductive charging). In such instances, male and female connectors (e.g., via Type 1, Type 2, Combo, and CHAdeMO connections) may be brought contact with one another for transferring power to the vehicle via a lift mechanism such as those described herein.

Additionally, although the above discussion is with regard to aligning a single charging coil with the vehicle coil, in some instances, multiple charging coils and/or vehicle coils may be used. For example, a vehicle charging space may include a first charging coil and a second charging coil that are brought into alignment with a first vehicle coil and a second vehicle coil, respectively. In other instances, one of the first charging coil or the second charging coil is brought into alignment with a single vehicle coil. In such instances, the use of multiple charging coils and/or multiple vehicle coils may reduce tolerances for aligning the charging coils and the vehicle coils for transferring power, and/or may increase a rate at which power is transferred. Examples of utilizing multiple charging coil(s) and/or vehicle coil(s) is discussed in U.S. patent application Ser. No. 17/364,213, filed Jun. 30, 2021, and U.S. patent application Ser. No. 17/364,257, filed Jun. 30, 2021, the entirety of which are herein incorporated by reference.

The systems and methods described herein therefore allow for charging of vehicles in a safe, efficient, and timely manner. As (or after) a vehicle enters a charging station, for example, charging coils can be brought into proximity with vehicle coils to transfer power to batteries of the vehicle. In some instances, lever arms, actuators, or other mechanisms are used to raise the charging coils into proximity with the vehicle coils. Sensor(s) may, additionally or alternatively, be used to aid in the position and/or orientation of the charging coil(s). By aligning the charging coils and the vehicle coils, the charging coils and/or the vehicle coils may include a smaller form factor and allow for improved thermal management generated during the transfer of power. The sensor(s) may also determine characteristic(s) of the vehicle, such as a location of the vehicle coils, for use in positioning the charging coil(s).

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims. Additionally, without limitation, while the following techniques are described with respect to motion of a device with respect to a vehicle (e.g., raising and/or lowering a coil or contact charger), it should be understood that the invention is not so limiting. For example, passive and/or active components located on the vehicle may be actuated to cause at least a portion of the vehicle to lower into proximity (or contact) with the charging coil and/or contact. As a non-limiting example, the vehicle may activate an active suspension system in order to bring any such coils into contact and/or proximity with infrastructure charging mechanisms, such as is described in U.S. patent application Ser. No. 15/837,820 entitled "Underbody Charging of Vehicles" and filed on Dec. 11, 2017, the entire contents of which are hereby incorporated by reference. Furthermore, any combination of techniques is contemplated (e.g., moving one or more of a portion of the vehicle and/or charging infrastructure via passive and/or active mechanisms).

FIG. 1 illustrates an example environment 100 including a vehicle 102. The vehicle 102 may be any configuration of vehicle, such as, for example, a van, a sport utility vehicle, a cross-over vehicle, a truck, a bus, an agricultural vehicle, and a construction vehicle. In some instances, the vehicle 102 may be powered by one or more electric motors, one or more internal combustion engines, any combination thereof (e.g., by a hybrid power train), and/or any other suitable electric power sources. In some instances, the vehicle 102 may be an autonomous vehicle configured to operate within the environment 100. However, in other examples, the vehicle 102 may be a fully or partially autonomous vehicle and the techniques described herein may be usable by non-autonomous vehicles as well.

In some instances, the environment 100 may represent charging station at which the vehicle 102 is charged for powering the vehicle 102. For example, the vehicle 102 may include one or more batteries 104 that are charged. In some instances, the vehicle 102 may arrive at the charging station according to predetermined schedules, based on a charge of the batteries 104, and so forth. In some instances, the charging station may include multiple spaces for charging a plurality of vehicles simultaneously (e.g., a fleet of vehicles). A single space is shown in FIG. 1, and here throughout, for charging the vehicle 102. However, it is to be understood that the environment 100 may include any number of spaces for charging vehicles.

In some instances, each space includes a charging system 106 that effectuates to transfer power to the vehicle 102. In some instances, the charging system 106 is configured to wirelessly charge the vehicle 102. For example, the charging system 106 includes charging elements, or charging coils 108, coupled to a power source 110. The power source 110 may receive direct current (DC) and/or alternating current (AC) from a source (e.g., battery, grid, etc.). The power source 110 may then supply AC to the charging coils 108, for example, via wires 112 coupled between the power source 110 and the charging coils 108. In some instances, the charging coils 108 may receive AC from a dedicated power source 110, such as that shown in FIG. 1, or the power source 110 may supply AC to multiple charging coils.

The charging coils 108 use the AC to inductively power vehicle elements, such as vehicle coils 114 associated with the vehicle 102. The wireless charging between the charging coils 108 and the vehicle coils 114 charges the batteries 104. Although not shown, the vehicle 102 may include power electronics, such as a bidirectional converter, inverter, rectifier, etc. coupled to the vehicle coils 114 for storing energy within the batteries 104. For example, the power electronics may receive the AC, convert the AC to DC, and transmit the DC to the batteries 104 for storage. As shown, the vehicle coils 114 may be located along/on a bottom of the vehicle 102 such that the charging coils 108 may be raised into proximity within the vehicle coils 114.

The environment 100 includes a lift mechanism 116 to effectuate wireless charging of the vehicle 102. As shown in FIG. 1, the lift mechanism 116 may be actuated to lift (e.g., raise) the charging coils 108 into proximity with the vehicle coils 114 for charging the vehicle 102. This proximity permits the charging coils 108 transfer power to the vehicle 102. In some instances, a wheel 118 of the vehicle 102 actuates the lift mechanism 116 to raise, and both lower, the charging coils 108 into proximity with the vehicle coils 114. To further illustrate, at "1" in FIG. 1 the vehicle 102 is shown approaching the lift mechanism 116. As such, at "1", the charging coils 108 are not lifted into position and the lift mechanism 116 is not actuated. Here, the lift mechanism 116 may be in a first position or retracted state.

In some instances, the lift mechanism 116 is actuated via the wheel 118 engaging with a plate 120 of the lift mechanism 116. For example, the vehicle 102 may drive onto the plate 120, causing the lift mechanism 116 to raise. The plate 120 is therefore of sufficient length and width to receive the wheel 118 of the vehicle 102. The plate 120 is exposed to the wheel 118 via a first passageway 122 disposed through a surface 124 on which the vehicle 102 drives. The surface 124 is drivable by the vehicle 102, and may include, for example, asphalt, concrete, gravel, pavement, etc. In some instances, the plate 120 may be disposed above the surface 124 (e.g., ramped) or may be flush with the surface 124. As such, the first passageway 122 permits the plate 120 to receive a load applied by the weight of the vehicle 102.

A second passageway 126 also extends through the surface 124 to permit the charging coils 108 to raise in proximity to the vehicle coils 114. The charging coils 108 are shown spaced inward from the wheel 118 (towards a center of the vehicle 102 and/or charging space in the environment 100) to reduce a likelihood of being driven over by the vehicle 102. In some instances, in the retracted state, or as shown at "1", the charging coils 108 may reside within the second passageway 126 or may be disposed external to the second passageway 126. Further, a door or other cover may be disposed over the charging coils 108 in the retracted state to prevent damage to the charging coils 108, but maneuvered out of way during a raising of the charging coils 108.

The lift mechanism 116, in some instances, includes a lever arm 128 coupled to the plate 120. Generally, the lever arm 128 translates a small motion of the vehicle 102 into larger motion of the charging coils 108. In some instances, a first member 130 (e.g., bar, linkage, strut, etc.), for example, may couple the lever arm 128 to the plate 120. As shown, first member 130 couples to a first end of the lever arm 128. A second end of the lever arm 128 couples to the charging coils 108 via a second member 132 (e.g., bar, linkage, strut, etc.). For example, the charging coils 108 are shown disposed at an end of second member 132, opposite to where the first member 130 couples to the lever arm 128. In some instances, although discussed as separate components, the lever arm 128, the first member 130, and the second member 132 may be embodied as a single piece of material. In such instances, the lever arm 128 may include multiple portions for effectuating lift of the charging coils 108. Moreover, the lift mechanism 116 may include other linkages for effectuating lift and positioning of the charging coils 108. Of course, such a linkage is demonstrated for illustration purposes only. In various other examples as described herein, such a coupling may be pneumatic, hydraulic, geared, or otherwise mechanically and/or electrically actuated.

In some instances, the lift mechanism 116 may be located with cavities disposed beneath the surface 124. Within the cavities, for example, the components of the lift mechanism 116 translate for raising the charging coils 108 into proximity with the vehicle coils 114, as well as retracting the charging coils 108 after charging. As such, the cavities may be sufficient size to permit the lift mechanism 116 to operate for charging the vehicle 102.

The lever arm 128 pivots about a fulcrum 134 to raise and lower the charging coils 108. As shown in FIG. 1, the fulcrum 134 is located more proximate to the first member 130 than the second member 132. This location of the fulcrum 134 is associated with a lever arm ratio that lifts the charging coils 108. In other words, as the wheel 118 contacts the plate 120, the first member 130 translates by a first amount (e.g., one inch) and the lever arm 128 pivots (e.g., rocks) about the fulcrum 134. In turn, the second member 132 translates in an opposite direction by a second amount (e.g., 10 inches). Here, because the second amount is larger than the first amount, the wheel 118 (and the vehicle 102) experiences little translation while the charging coils 108 are brought into proximity with the vehicle coils 114. However, the position of the fulcrum 134 along the length of the lever arm 128 may be different than shown to adjust a lift height of the charging coils 108. For example, adjusting the position of the fulcrum 134 along the length of the lever arm 128 may adjust a ratio between the amount of depression experienced by the plate 120 and the amount of lift by the charging coils 108. Moving the fulcrum 134 may also adjust an amount of weight required to lift the charging coils 108. In various examples, the positions of the fulcrum 134 may be determined for different types or classes of vehicles such that various vehicles positioned over the charging system 106 may cause the charging coils 108 to be optimally positioned without the need for any active components.

Charging of the vehicle 102 is shown at "2" in FIG. 1. Here, the lift mechanism 116 transitions to an extended state (second position). For example, the lever arm 128 lifts the charging coils 108 and power is transferred to the vehicle 102. As also shown in FIG. 2, the wires 112 (e.g., flex wire) may extend and include sufficient slack to permit the charging coils 108 to extend towards the vehicle 102. Once in position, the power source 110 may transfer power to the vehicle 102 until the batteries 104 are fully charged, or charged to a given amount. After charging, the vehicle 102 may drive off of the plate 120, causing the lever arm 128 to pivot and retract the charging coils 108.

As noted above, the vehicle 102 may represent an autonomous vehicle capable to autonomously operating within the environment 100. In some instances, upon entering the environment 100 (e.g., the charging station), the vehicle 102 may send a communication requesting to access the charging station. Such communication may also include a vehicle identifier and/or information identifying a charging system of the vehicle 102 (e.g., capacities, coil spacing, etc.). Using this information, a charging station that is available may be determined and instructions may be transmitted back to the vehicle 102. As such, the communication may include location information or other details that enable the vehicle 102 to determine a location of the assigned charging station.

Although FIG. 1 illustrates, and the discussion above relates to, wirelessly charging the vehicle 102, in some instances, the vehicle 102 may be charged via contact-based technologies. For example, in addition to or alternatively from the vehicle 102 including the vehicle coils 114 and the charging system 106 including the charging coils 108, the vehicle 102 may include connectors that couple with connectors of the charging system 106 using plugs or other physical electrical contacts. Example connectors include Type 1, Type 2, Combo, and CHAdeMO connections. Here, the techniques discussed above and herein are applicable to contact-based charging. For example, the lift mechanism may bring a connector into contact with a connector on the vehicle 102 for transferring power.

The charging coils 108 and the vehicle 102 coils are shown located at particular locations, however, other embodiments are envisioned. For example, the charging coils 108 and/or the vehicle coils 114 may be located more proximal sides (e.g., lateral sides) of the vehicle 102. Still, the charging coils 108 and/or the vehicle coils 114 may be shaped differently than shown and/or may be smaller than or larger than as shown. In some instances, the vehicle 102 may include multiple vehicle coils 114 that are charged by respective charging coils 108. For example, the vehicle 102 may include two vehicle coils 114 that are spaced apart from one another (laterally or longitudinally along the vehicle 102). In some instances, respective lift mechanisms 116 may align the charging coils 108 with respective vehicle coils 114. As such, the vehicle 102 may include single or multiple vehicle coils 114, and that the charging station may include one or more charging coils 108. Different vehicle makes/models may have different numbers, sizes, and/or position of vehicle coils 114. The charging station may determine the number and location of charging coils to use to charge the vehicle 102. Some vehicles may be charged by multiple charge coils simultaneously. In some examples, a single larger vehicle coil may be charged by multiple concentric charging coils (e.g., a 50 kW central coil encircled by a 50 kW outer ring/coil). In that case, the central coil may be used by itself to charge vehicles with lower power requirements and/or smaller vehicle coils, while both the central coil and the outer ring/coil may be collectively used to charge vehicles with higher power requirements and/or larger vehicle coils. In some instances, each charging coil may have its own lift mechanism, or a single lift mechanism may be used to lift multiple charge coils.

Figure 2A:
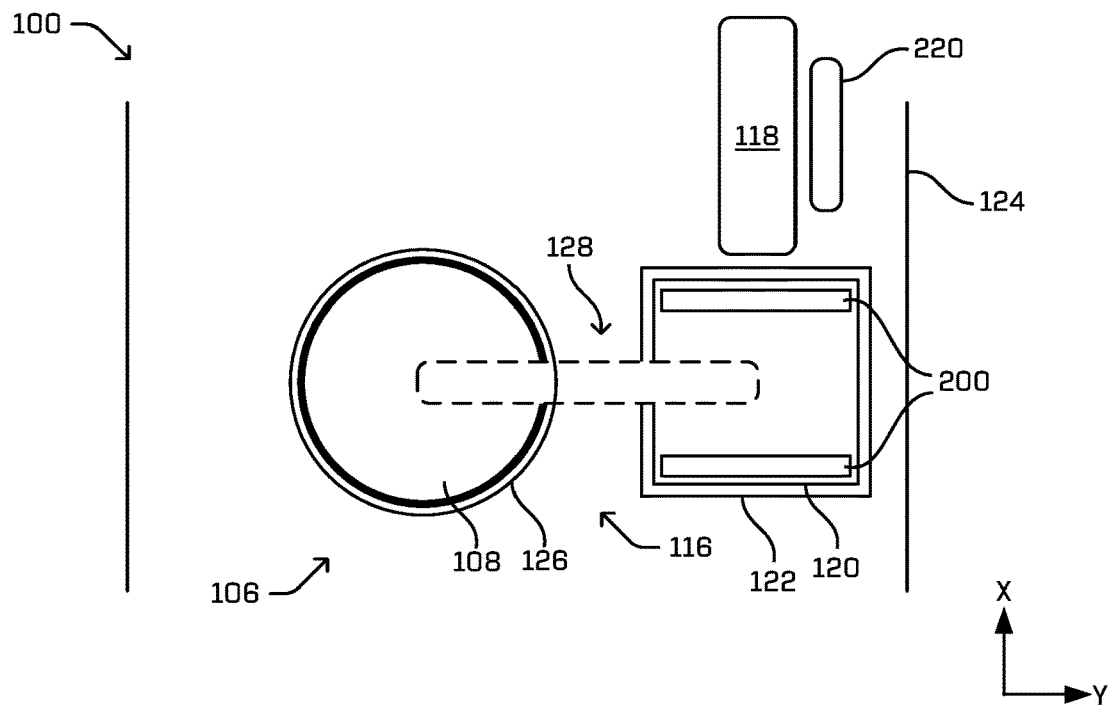
FIG. 2A illustrates a top view of the charging system of FIG. 1, according to an example of the present disclosure.

FIG. 2A illustrates a top down view of the environment 100, showing components of the charging system 106 and the lift mechanism 116. As shown, the environment 100 includes the surface 124 onto which the vehicle 102 maneuvers. The first passageway 122 and the second passageway 126 provide an opening through which the plate 120 and the charging coils 108 are disposed, respectively. For example, the plate 120 resides at least partially within the first passageway 122, and may be depressed (Z-direction into the page) under the weight of the vehicle 102. As the wheel 118 of the vehicle 102 drives onto the plate 120, the lever arm 128 actuates to raise the charging coils 108 through the second passageway 126.

In some instances, the plate 120 may include extrusions 200 (e.g., ridges, bumps, channels, etc.) that extend from a surface of the plate 120. The extrusions 200 may assist in securing the wheel 118 (and the vehicle 102) within the environment 100 during a charging of the vehicle 102. For example, the wheel 118 may reside within, or at least partially between, the extrusions 200 to prevent the vehicle 102 from shifting (X-direction) when the vehicle 102 is charged. In some instances, the extrusions 200 extend along the plate 120, transverse to a longitudinal direction of the vehicle 102. However, the extrusions 200 may be implemented differently than shown, and/or other features may be used to secure the vehicle 102 on the plate 120. For example, the plate 120 may include a "U-shaped" trough that is sized to receive at least a portion of the wheel 118. Here, similar to the extrusions 200, the "U-shaped" trough may resist movement of the wheel 118 during charging.

In some instances, the environment 100 may include a bumper 220 in which the wheel 118 may engage as the vehicle 102 enters the charging station. The bumper 220 may couple to the lift mechanism 116 to translate the lift mechanism in the Y-direction (side to side) based on the position of the wheel 118. For example, when the vehicle 102 enters the charging station, a side of the wheel 118 (or tire) may engage with the bumper 220. In turn, this may cause the lift mechanism 116 to be physical pushed (e.g., translated) from side to side. This sideways movement may laterally align the charging coils 108 with the vehicle coils 114. In such instances, the lift mechanism 116 may be disposed on slides or other moveable-type channels such that if the wheel 118 contacts the bumper 220, the lift mechanism 116 is translated for aligning the vehicle coils 114 and the charging coils 108. Therein, once the wheel 118 engages the lift mechanism 116, the lift mechanism 116 may raise the charging coils 108 into position. Although the bumper 220 is shown on one side of the wheel 118, more than one bumper may be included for translating the lift mechanism 116 and/or the bumper 220 may be located on an alternate side of the wheel 118.

Figure 2B:
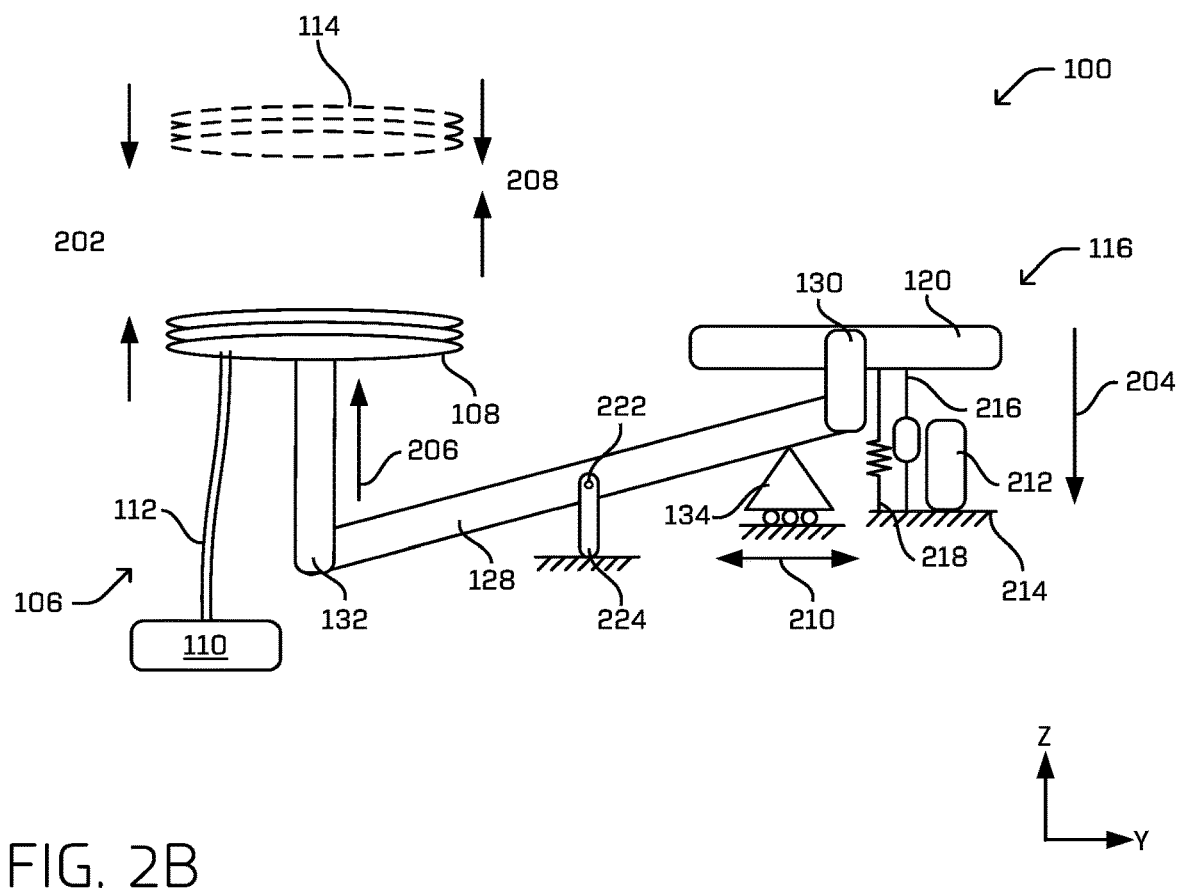
FIG. 2B illustrates a side view of the charging system and the lift mechanism of FIG. 1, according to an example of the present disclosure.

FIG. 2B illustrates a side view of the lift mechanism 116, showing detailed components of the lift mechanism 116. Introduced above, the lift mechanism 116 may include the lever arm 128, which couples to the plate 120 via the first member 130. On an opposite end, the lever arm 128 couples to the second member 132. The second member 132 supports the charging coils 108 and raises the charging coils 108 into proximity with the vehicle coils 114. In FIG. 2B, the lift mechanism 116 is shown in a retracted state, whereby the charging coils 108 are spaced apart from the vehicle coils 114. During such, power is not transferred to the vehicle 102.

In the retracted state, the charging coils 108 and the vehicle coils 114 may be spaced apart by a first gap 202. The first gap 202 may be of a sufficient distance to resist the charging coils 108 contacting an undercarriage of the vehicle 102 to prevent damage to the vehicle 102 and/or the charging coils 108. In some instances, the first gap 202 may be five inches, six inches, twelve inches, and so forth. However, the first gap 202 may be minimal to limit the amount of travel by the charging coils 108 when the lift mechanism 116 is activated. In other words, the first gap 202 permits the vehicle 102 to enter and exit a charging station without damaging the charging coils 108, but may be minimal to limit the amount of raise required to bring the charging coils 108 into a charging distance with the vehicle coils 114.

As the wheel 118 drives onto the plate 120, the weight of the vehicle 102 causes the lift mechanism 116 to raise (Z-direction). In this instance, the plate 120 may move in a first direction 204, and the charging coils 108 may move in a second direction 206 that is opposite the first direction 204. Movement of the charging coils 108 is accomplished by the fulcrum 134 and the lever arm 128 pivoting about the fulcrum 134. As such, as the plate 120 moves in the first direction 204, the lever arm 128 pivots about the fulcrum 134, and the charging coils 108 are raised in the second direction 206 to effectuate charging of the vehicle 102.

The charging coils 108 are raised to within a second gap 208 disposed between the charging coils 108 and the vehicle coils 114. In some instances, the second gap 208 may be between 100 mm and 200 mm. In some instances, the second gap 208 is representative of a gap distance separating the charging coils 108 and the vehicle coils 114. For example, a frame of the body of the vehicle 102 may be interposed between the charging coils 108 and the vehicle coils 114. The wires 112 couple the charging coils 108 to the power source 110, and include sufficient length to permit raising (and retraction) of the charging coils 108 towards the vehicle coils 114.

In some instances, the fulcrum 134 is disposed on wheels (or other tracks, channels, etc.) that enables the pivot point of lever arm 128 to be adjusted. For example, moving a position of the fulcrum 134 along the length of the lever arm 128 may adjust an amount by which the charging coils 108 are raised. In other words, adjusting a position of the fulcrum 134 may adjust the first gap 202 and/or second gap 208. As shown in FIG. 2B, the fulcrum 134 may be adjusted in a third direction 210. Furthermore, adjusting the fulcrum 134 may adjust an amount of force required to lift the charging coils 108 into proximity with the vehicle coils 114. The adjustments to the position of the fulcrum 134 may be based at least in part on the characteristic(s) of the vehicle 102, such as a ground clearance, wheel base, geometries, and/or characteristic(s) of the vehicle coils 114, such as location, size, and so forth. Although not shown, in some instances, the fulcrum 134 may be dynamically adjusted based on determining characteristic(s) of the vehicle 102 being charged. As such, the first gap 202, the second gap 208, and/or the force required to raise the charging coils 108 may be dynamically adjusted according to specifics of the vehicle 102 (or the vehicle coils 114). As a non-limiting example, information associated with the vehicle 102 (e.g., as may be received from the vehicle 102 via a wireless transmission) may be used to determine a position of the fulcrum 134 to provide optimal positioning of the charging coils 108 given the underbody spacing, weight of the vehicle 102, etc. Here, pneumatic or hydraulic cylinders, or other actuators, may adjust the position of the fulcrum 134. The position of the fulcrum 134, or the actuation of the actuator to adjust the position of the fulcrum 134, may be based on characteristic(s) of the vehicle 102 (e.g., weight, ground clearance, location of vehicle coils 114, size of the vehicle coils 114, and so forth. As discussed herein, such characteristic(s) may be based on information captured by one or more sensor(s) at the charging station.

In some instances, rather than moving the fulcrum 134 in the third direction 210, the wheel 118 of the vehicle 102 may be moved. For example, slides may engage with sides of the wheel 118, for translating the wheel 118 in the third direction 210. Here, the lateral position of the wheel 118 on the plate 120 (e.g., Y-direction) may adjust the amount of force applied to the lever arm 128. In turn, based on the force applied to the lever arm 128, a lift height of the charging coils 108 in the second direction 206 may be adjusted. In some instances, the position of the wheel 118 on the plate 120 may be adjusted for dynamically changing the required lift height of the charging coils 108 for effectuating charging of the vehicle 102 with the desired second gap 208. Additionally, or alternatively, the position of the wheel 118 on the plate 120 may adjust a position of the charging coils 108 laterally and/or longitudinally (relative to the vehicle 102) once raised.

In some instances, the lift mechanism 116 may be associated with a stop 212 that prevents the lever arm 128 from displacing more than a threshold amount. For example, the stop 212 may represent a strut that prevents the plate 120 traveling in the first direction 204 by more than the threshold amount. The stop 212 prevents or limits a depression of the plate 120 by more than threshold amount. This may limit a lift of the charging coils 108 and/or prevent damage to charging system 106. In some instances, the stop 212 may extend from a sub surface 214 that is disposed beneath the surface 124. However, in some instances, the stop 212 may extend from the plate 120, in a direction towards the sub surface 214. A length of the stop 212 (Z-direction) may also be adjustable.

The lift mechanism 116 may also include a dampener 216 coupled between the plate 120 and the sub surface 214. The dampener 216 may gradually raise the charging coils 108 in the second direction 206 as the wheel 118 drives onto the plate 120. As shown, the dampener 216 may be disposed between the plate 120 and the surface 124. The dampener 216 may also gradually lower the charging coils 108 after the wheel 118 is removed from the plate 120. Such gradual lowering may prevent damage to the charging coils 108. A spring 218 is also shown disposed between the plate 120 and the sub surface 214. In some instances, the spring 218 may maintain a positioning of the plate 120 in the retracted state (e.g., for actuating lift of the charging coils 108). That is, the spring 218 may provide a force to the plate 120 such that the plate 120 maintains a position within the first passageway 122 until the wheel 118 provides a reactive force to overcome the spring 218. In some instances, the spring 218 may also resist the plate 120 extending in the first direction 204 until the spring 218 is compressed. As such, when the spring 218 is compressed, the lift mechanism 116 may transition between a retracted state and an extended state.

The spring 218 may also, in some instances, allow for different elevation adjustments for different weights of vehicles. For example, a spring constant of the spring 218 may be static, or dynamic, to adjust the amount of force required to compress the spring 218. Although the dampener 216 and the spring 218 are shown as residing in certain locations, and/or coupled to certain components, the dampener 216 and/or the spring 218 may be located. Additionally, or alternatively, more than one dampener and/or spring may be included.

In some instances, a locking pin 222 may further be included to lock the lift mechanism 116 in the retracted position and/or the raised position. For example, the locking pin may lock the lift mechanism 116 in the retraced position as the vehicle 102 drives over the charging coils 108 and until the vehicle 102 is in correct position for charging (e.g., on the plate 120). Therein, the locking pin 222 may release to allow the lift mechanism 116 to transition from the retracted position to the raised position in which the charging coils 108 are positioned proximate the vehicle coils 114. As shown, the locking pin 222 may be secured to the lever arm 128 and a strut 224 secured to the sub surface 214 (or other attachment point). Although described as a locking pin, a latch or other member and may be mechanically actuated (e.g., by the vehicle 102 or a component of the vehicle 102 such as the wheel 118 or the bumper 220 contacting a release switch), electrically actuated (e.g., by activation of a solenoid switch or electric motor), or other actuation mechanism (e.g., by application of a hydraulic, pneumatic, magnetic, or other motive force to release the locking mechanism). For example, when the locking pin 22 is engaged with the lever arm 128 and the strut 224, the lift mechanism 116 may be prevent from transitioning to the raised position. That is, the coupling between the lever arm 128 and the strut 224 prevents the lever arm 128 from pivoting and raising the charging coils 108 into position. When the locking pin 222 is disengages the lever arm 128 and the strut 224, the lever arm 128 is permitted to lift the charging coils 108 into place.

Figure 3A:
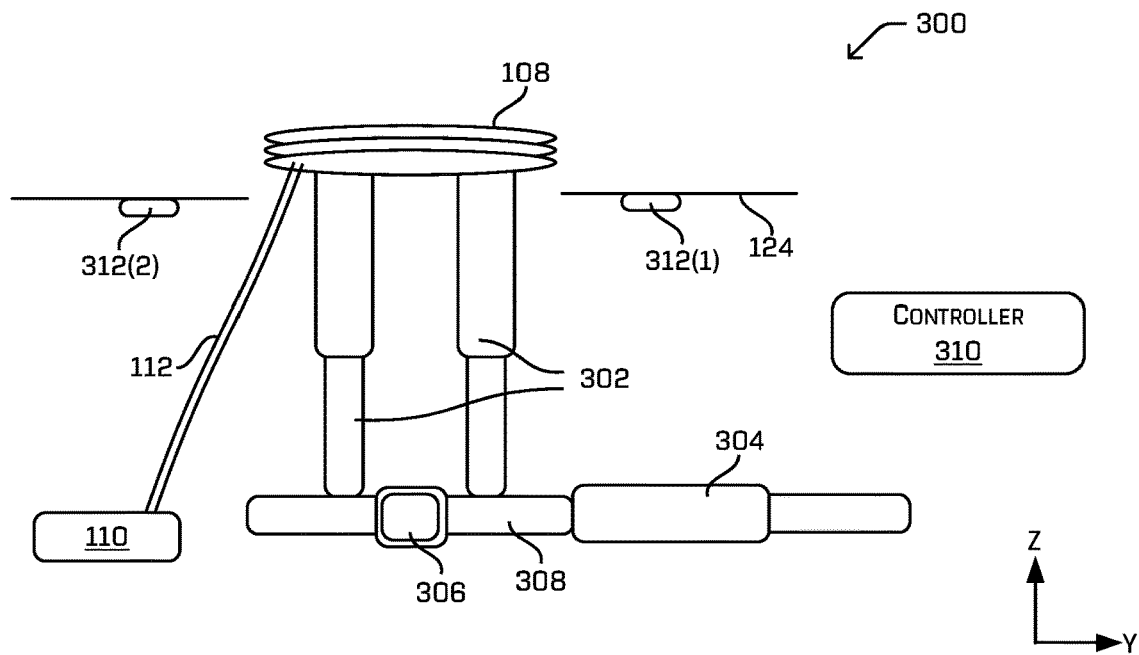
FIG. 3A illustrates a side view of an alternate charging system and lift mechanism usable to charge the battery of the vehicle of FIG. 1, according to an example of the present disclosure.
Figure 3B:
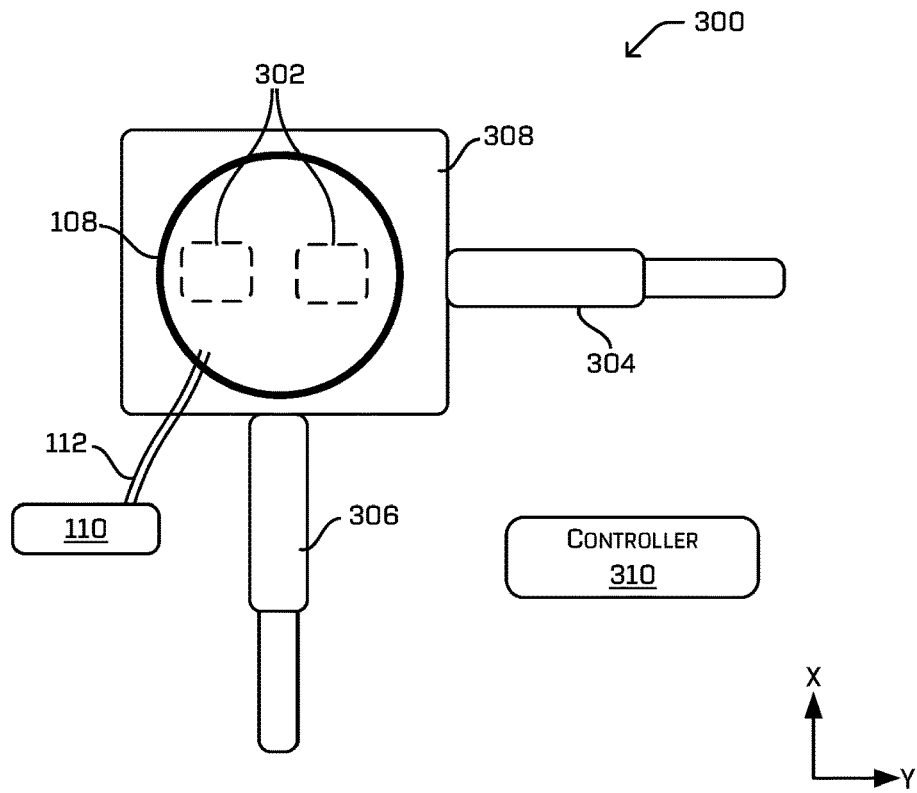
FIG. 3B illustrates a top view of the alternate charging system and lift mechanism of FIG. 3A, according to an example of the present disclosure.

FIGS. 3A and 3B illustrate an alternate lift mechanism 300 for bringing the charging coils 108 into proximity with the vehicle coils 114. FIG. 3A illustrates a side view of the lift mechanism 300, whereas FIG. 3B illustrates a top view of the lift mechanism 300. In some instances, the lift mechanism 300 may be embodied within the environment 100, such as at a charging station for charging the vehicle 102.

Compared to the lift mechanism 300 as discussed above, the lift mechanism 300 may include one or more actuators coupled to the charging coils 108 for raising and lowering the charging coils 108 into proximity with the vehicle coils 114. For example, the lift mechanism 300 may include one or more first actuator(s) 302, one or more second actuator(s) 304, and/or one or more third actuator(s) 306. In some instances, the first actuator(s) 302 may extend and retract in the vertical direction (Z-direction), the second actuator(s) 304 may extend and retract in a lateral direction (Y-direction), and the third actuator(s) 306 may extend and retract in a longitudinal direction (X-direction). The first actuator(s) 302, the second actuator(s) 304, and/or the third actuator(s) 306 may represent pneumatic, hydraulic, linear actuators, screw-type actuators, and so forth that are configured to extend and retract for changing a position and/or orientation of the charging coils 108 (e.g., depending on the respective extension of first actuator(s) 302, the second actuator(s) 304, and/or the third actuator(s) 306).

In some instances, the first actuator(s) 302, the second actuator(s) 304, and/or the third actuator(s) 306 may couple to a base 308 that is moveable laterally (Y-direction) and longitudinally (X-direction). For example, the second actuator(s) 304 and/or the third actuator(s) 306 may extend and retract to adjust the lateral and/or longitudinal position of the charging coils 108. As such, as the second actuator(s) 304 and/or the third actuator(s) 306 actuate, the base 308 may move for adjusting the position of the charging coils 108. As shown, the first actuator(s) 302 extend from the base 308. As the second actuator(s) 304 and/or the third actuator(s) 306 actuate, the first actuator(s) 302 may correspondingly move with a movement of the base 308. In some instances, the first actuator(s) 302, the second actuator(s) 304, and/or the third actuator(s) 306 may pivotably or fixedly couple to the base 308. Ends of the second actuator(s) 304 and/or the third actuator(s) 306 not coupled to base 308 are secured so as to provide forces that move the base 308. In some instances, the base 308 may travel on rollers, slides, guides, and so forth for permitting movement of the base 308 laterally and longitudinally.

Movement of the first actuator(s) 302, the second actuator(s) 304, and/or the third actuator(s) 306 may be controlled at least in part by a controller 310. The controller 310 may communicatively couple (wired or wirelessly) with the first actuator(s) 302, the second actuator(s) 304, and/or the third actuator(s) 306. The controller 310 may transmit instructions to the first actuator(s) 302, the second actuator(s) 304, and/or the third actuator(s) 306 for controlling an extension and retraction thereof. To aid in this, the controller 310 may communicatively couple to sensor(s) 312 (e.g., a first sensor 312(1) and a second sensor 312(2)) disposed on, within, or beneath the surface 124. The sensor(s) 312 may be located beneath an undercarriage of the vehicle 102, when the vehicle 102 is in the charging station. However, the sensor(s) 312 may be located at different locations than shown. The sensor(s) 312 may be configured to image the vehicle 102 for determining a location of the vehicle coils 114. For example, the sensor(s) 312 may represent camera(s) that image fiducial(s) or other marker(s) on the vehicle 102. The sensor(s) 312 provide this data to the controller 310, and in turn, the controller 310 may determine characteristic(s) of the vehicle 102, such as a ground clearance, a distance between the surface 124 and the vehicle coils 114, and/or a location of the vehicle coils 114. Based on the location of the vehicle coils 114, the controller 310 may cause the first actuator(s) 302, the second actuator(s) 304, and/or the third actuator(s) 306 to actuate for positioning the charging coils 108 in proximity to the vehicle coils 114. Furthermore, the controller 310 may continuously receive data from the sensor(s) 312 for adjusting the first actuator(s) 302, the second actuator(s) 304, and/or the third actuator(s) 306.

In some instances, actuation of the lift mechanism 300 may come by way of measuring an impedance between the charging coils 108 and the vehicle coils 114. For example, as the vehicle 102 enters the charging station, an impedance between the charging coils 108 and the vehicle coils 114 may change (e.g., increase and/or decrease). In some instances, the impedance may be measured for use in aligning the charging coils 108 with the vehicle coils 114. For example, as the impedance changes, this may indicate that the vehicle 102 is driving into the charging station, and as such, the lift mechanism 300 may be actuated to raise the charging coils 108. In some instances, sensor data collected by the sensor(s) 312 or additional sensor(s) may measure the impedance. Similarly, when the sensor(s) 312 or the additional sensor(s) measure that the impedance is changing again (e.g., decreasing and/or increasing—or otherwise diverging from a static state), this may indicate that the vehicle 102 is leaving the charging station. In response, the lift mechanism may be lowered. In some instances, the measured impedance value may also be used to position the charging coils 108. For example, the measured impedance may be used to position the charging coils 108 in alignment with the vehicle coils 114.

The controller 310 may also communicatively couple to computing components of the vehicle 102 for charging the vehicle 102. For example, the controller 310 may receive an indication that the vehicle 102 has arrived and/or parked at the charging station. Therein, the controller 310 may cause the sensor(s) 312 to capture data for controlling the first actuator(s) 302, the second actuator(s) 304, and/or the third actuator(s) 306, as well as energize the charging coils 108. Furthermore, the controller 310 may receive indications associated with a charged state of the batteries 104. When the batteries 104 are charged, the controller 310 may receive an indication of such and, in response, the controller 310 may instruct the first actuator(s) 302, the second actuator(s) 304, and/or the third actuator(s) 306 to retract for lowing the charging coils 108 from the vehicle coils 114, as well as deenergize the charging coils 108. Additionally, or alternatively, the controller 310 may be communicatively coupled to other computing device(s). These computing device(s) located at/within the environment 100 or may be remote from the environment 100. In some instances, the controller 310 may be responsive to instructions from the computing device(s) for actuating the lift mechanism 300.

The controller 310 may include processor(s) and memory, where the processor(s) may perform various functions and operations associated with controlling the first actuator(s) 302, the second actuator(s) 304, and/or the third actuator(s) 306, processing the sensor data from the sensor(s) 312, etc. and the memory may store instructions executable by the processor(s) 902 to perform the operations described herein.

As further shown, the charging coils 108 are coupled to the power source 110 and the wires 112 for transferring power to the vehicle 102.

Although FIGS. 3A and 3B illustrate a certain number of the first actuator(s) 302, the second actuator(s) 304, and/or the third actuator(s) 306, the first actuator(s) 302, the second actuator(s) 304, and/or the third actuator(s) 306 may include more than or less than the number of actuators than shown, respectively. Furthermore, the first actuator(s) 302, the second actuator(s) 304, and/or the third actuator(s) 306 may be disposed at different angles, or orientations, than shown. In some instances, some of the first actuator(s) 302, the second actuator(s) 304, and/or the third actuator(s) 306 may be omitted and movement of the charging coils 108 may be accomplished by other mechanisms. For example, a turntable may be used instead of the second actuator(s) 304 and/or the third actuator(s) 306 for changing a position and/or orientation of the charging coils 108. In some instances, the base 308 may be omitted and movement of the charging coils 108 may come by way of extending and retracting the first actuator(s) 302, the second actuator(s) 304, and/or the third actuator(s) 306, without movement of the base 308.

In some instances, rather than the sensor(s) 312 determining a location of the vehicle coils 114 for use by the controller 310 to make adjustments, the charging coils 108 and/or the vehicle coils 114 may detect impedances. These impedances may be measured (e.g., based on the AC perturbated at the charging coils 108 and/or the vehicle coils 114). These values may be a compared to threshold or stored values that indicate whether the charging coils 108 and/or the vehicle coils 114 to result in efficient inductive charging.

Figure 4:
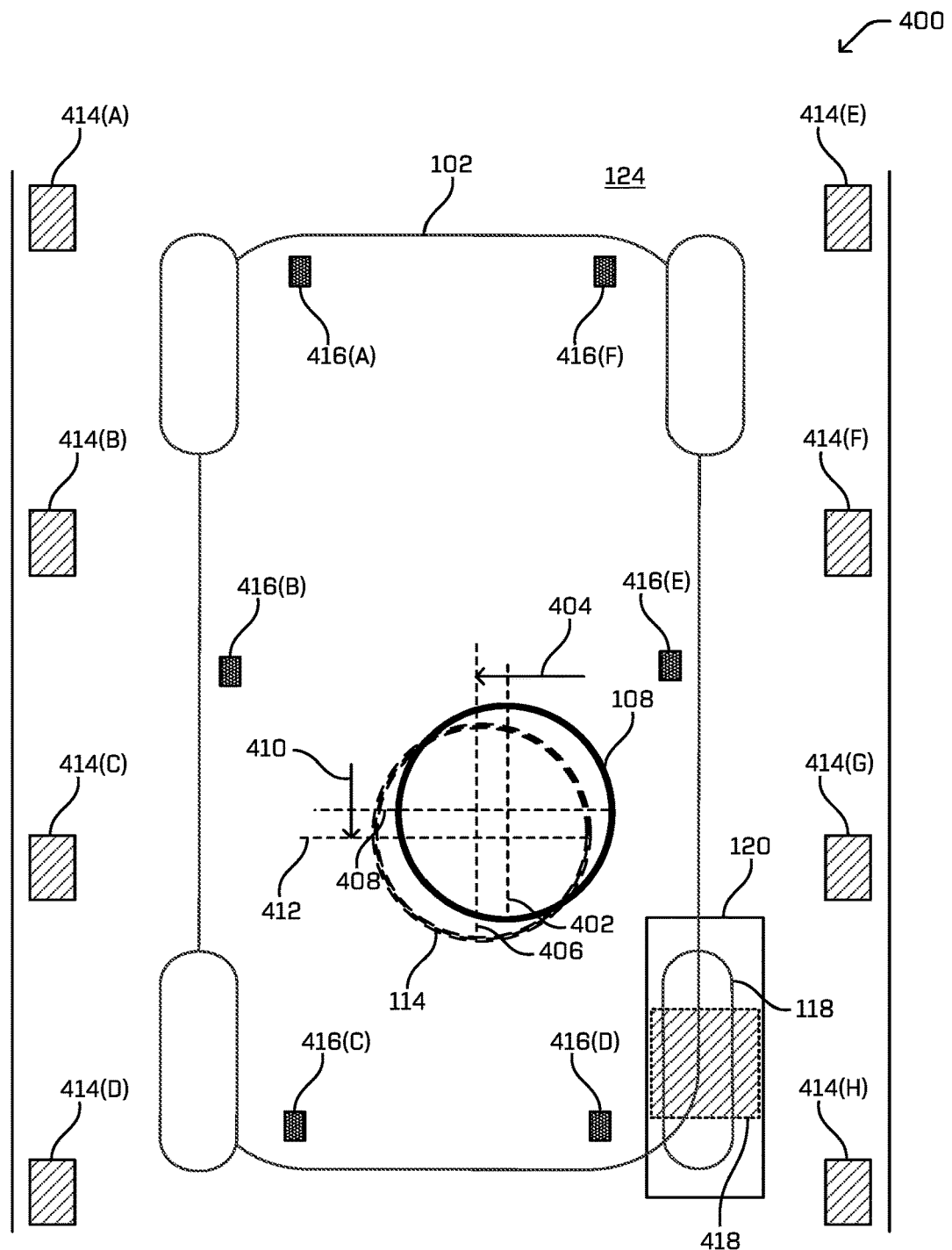
FIG. 4 illustrates example sensor(s) of the alternate charging system of FIG. 3A for adjusting a position and/or orientation of components of the alternate charging system, according to an example of the present disclosure.

FIG. 4 illustrates a top down view of an example charging station 400, showing the vehicle 102 within the charging station 400. In some instances, the charging station 400 may include the lift mechanism 300 introduced above in FIG. 3A to control a position and/or orientation of the charging coils 108. A position of the charging coils 108 relative to the vehicle coils 114 is shown. As discussed herein, the first actuator(s) 302, the second actuator(s) 304, and/or the third actuator(s) 306 may position and/or otherwise orient the charging coils 108 relative to the vehicle coils 114 for wirelessly charging the vehicle 102.

As illustrated in FIG. 4, the charging coils 108 may be misaligned (e.g., off centered) with the vehicle coils 114 upon arriving at the charging station 400. For example, as illustrated in FIG. 4, a first longitudinal midline 402 of the charging coils 108 is offset by a first distance 404 from a second longitudinal midline 406 of the vehicle coils 114. To reduce the first distance 404, the first actuator(s) 302, the second actuator(s) 304, and/or the third actuator(s) 306 may actuate to bring the charging coils 108 into alignment with the vehicle coils 114 (Y-direction). Additionally, as also shown, a first lateral midline 408 of the charging coils 108 is offset by a second distance 410 from a second lateral midline 412 of the vehicle coils 114. Here, to reduce the second distance 410, the first actuator(s) 302, the second actuator(s) 304, and/or the third actuator(s) 306 may actuate to bring the charging coils 108 into alignment with the vehicle coils 114 (X-direction). It should be understood that the charging coils 108 may also be lifted (e.g., Z-direction) to bring the charging coils 108 into proximity with the vehicle coils 114. Additionally, with the first actuator(s) 302, the second actuator(s) 304, and/or the third actuator(s) 306, the charging coils 108 may be orientated about a plurality of axes to effectuate charging of the vehicle. More generally, in some instances, the charging coils 108 and the vehicle coils 114 may be concentric, or substantially concentric, with one another (e.g., within 0.25 inches, 0.5 inches, one inch, etc.) to efficiently transfer power to the vehicle 102.

The first distance 404 and/or the second distance 410, or other offsets, may be caused based on a plurality of factors. For example, different sizes of vehicles, a weight of the vehicle 102, a position of the vehicles at the charging station, a position of the charging coils 108 (from a previous charge) may all affect the distances at which the charging coils 108 are offset from the vehicle coils. However, the first actuator(s) 302, the second actuator(s) 304, and/or the third actuator(s) 306 are configured to account for such variations to properly align the charging coils 108 with the vehicle coils 114. In some instances, certain offsets between the charging coils 108 and the vehicle coils 114 may be acceptable. For example, misalignment of the charging coils 108 and the vehicle coils 114 in one or more directions may be acceptable and still permit efficient charging of the vehicle 102 (e.g., 0.25 inches, 0.5 inches, one inch, etc.).

As introduced above, the charging station may be configured to charge a variety of different vehicle types, where each of the vehicles has different attributes (e.g., size, power system capabilities, maneuverability, automation, etc.). Here, the charging station 400 may include a plurality of sensors 414(A)-(H) that are disposed across the surface 124 of the charging station 400. The sensors 414(A)-(H) may represent imaging devices (e.g., cameras), radar sensors, lidar sensors, proximity sensors, an RF transmitter or receiver (e.g., an RFID reader, Bluetooth receiver, NFC receiver, wifi receiver, etc.), or any other sensor capable of detecting information about the vehicle 102. The sensors 414(A)-(H) may be configured to image the vehicle 102 and/or otherwise determine characteristic(s) of the vehicle 102, such as for example, a location of the vehicle 102 at the charging station 400, a geometry of the vehicle 102 (e.g., length, width, height), a ground clearance of the vehicle 102, a wheelbase of the vehicle 102, a make/model of the vehicle 102, a location of the vehicle coils 114 on the vehicle 102, and so forth. Such information is usable to align the charging coils 108 and the vehicle coils 114. Additionally, the sensors 414(A)-(H) may be configured to determine characteristic(s) of the charging coils 108, such as a location of the charging coils 108 relative to the vehicle coils 114, a height of the charging coils 108 above the surface 124, and so forth.

As shown, the sensors 414(A)-(D) may be disposed along a first lateral side of the vehicle 102 (right-hand side), and the sensors 414(E)-(H) may be disposed along a second lateral side of the vehicle 102 (left-hand side). However, the sensors 414(A)-(H) may be disposed at the charging station 400 differently than shown, and/or the charging station 400 may include a greater or lesser number of sensors than shown.

The sensors 414(A)-(H) are configured to output data (e.g., sensor data) to the controller 310. In response, the controller 310 may control or otherwise instruct the first actuator(s) 302, the second actuator(s) 304, and/or the third actuator(s) 306 may actuate to bring the charging coils 108 into alignment with the vehicle coils 114. For example, based on the sensor data, the controller 310 may cause the first actuator(s) 302, the second actuator(s) 304, and/or the third actuator(s) 306 to actuate.

In some instances, the sensors 414(A)-(H) may be configured to image the markers 416(A)-(F) on the vehicle 102. In some instances, the markers 416(A)-(F) may be located along sides of the vehicle 102, a bottom of the vehicle 102, a top of the vehicle 102, a front of the vehicle 102, and/or a back of the vehicle 102. The markers 416(A)-(F) may be associated with identifying characteristic(s) of the vehicle 102, such as a vehicle height, a location of the vehicle coils 114, and/or specifics of the vehicle coils 114 (e.g., size). As part of imaging the markers 416(A)-(F), the controller 310 may determine the characteristic(s) of the vehicle 102 for use in adjusting a position of the charging coils 108.

The charging station 400 is further shown including the plate 120 on which the wheel 118 of the vehicle 102 may reside. The plate 120 is shown including a sensor pad 418 onto which a portion of the wheel 118 contacts. The sensor pad 418 may represent a capacitive or resistive-type sensor pad. Additionally or alternatively, the sensor pad 418 may include a plurality of proximity sensors. Regardless of the specific implementation, the sensor pad 418 may be used to determine a position of the vehicle 102 within the charging station 400. For example, based on the location of the wheel 118 on the sensor pad 418 (X and/or Z-direction), the location of the vehicle 102 within the charging station 400 may be determined. Such information may indicate a location of the vehicle coils 114 as well. The controller 310 may receive sensor data from the sensor pad 418 for use in controlling the first actuator(s) 302, the second actuator(s) 304, and/or the third actuator(s) 306 to bring the charging coils 108 into alignment with the vehicle coils 114. Any combination of sensor data from the sensors 414(A)-(H) and the sensor pad 418 (as well as additional sensor(s)) may be used to control the first actuator(s) 302, the second actuator(s) 304, and/or the third actuator(s) 306.

In some instances, the vehicle 102 may include sensor(s) that are arranged to image or detect marker(s) for use in position the vehicle 102 at the charging station. For example, the sensor(s) may image marker(s) on the surface 124, determine a position of the vehicle 102 at the charging station, and in turn, maneuver the vehicle 102 such that the vehicle coils 114 are aligned with the charging coils 108. In other words, rather than moving the charging coils 108, the vehicle 102 may itself reposition for aligning the charging coils and the vehicle coils 114. However, in some instances, the vehicle 102 and the charging coils 108 may coordinate to align the charging coils 108 and the vehicle coils 114.

Although FIG. 4 illustrates aligning a single set of charging coils 108 and vehicle coils 114, in some instances, a lift mechanism may align multiple sets of charging coils 108 and vehicle coils 114. Additionally or alternatively, multiple lift mechanisms may align the charging coils 108 and the vehicle coils 114, respectively.

Figure 5:
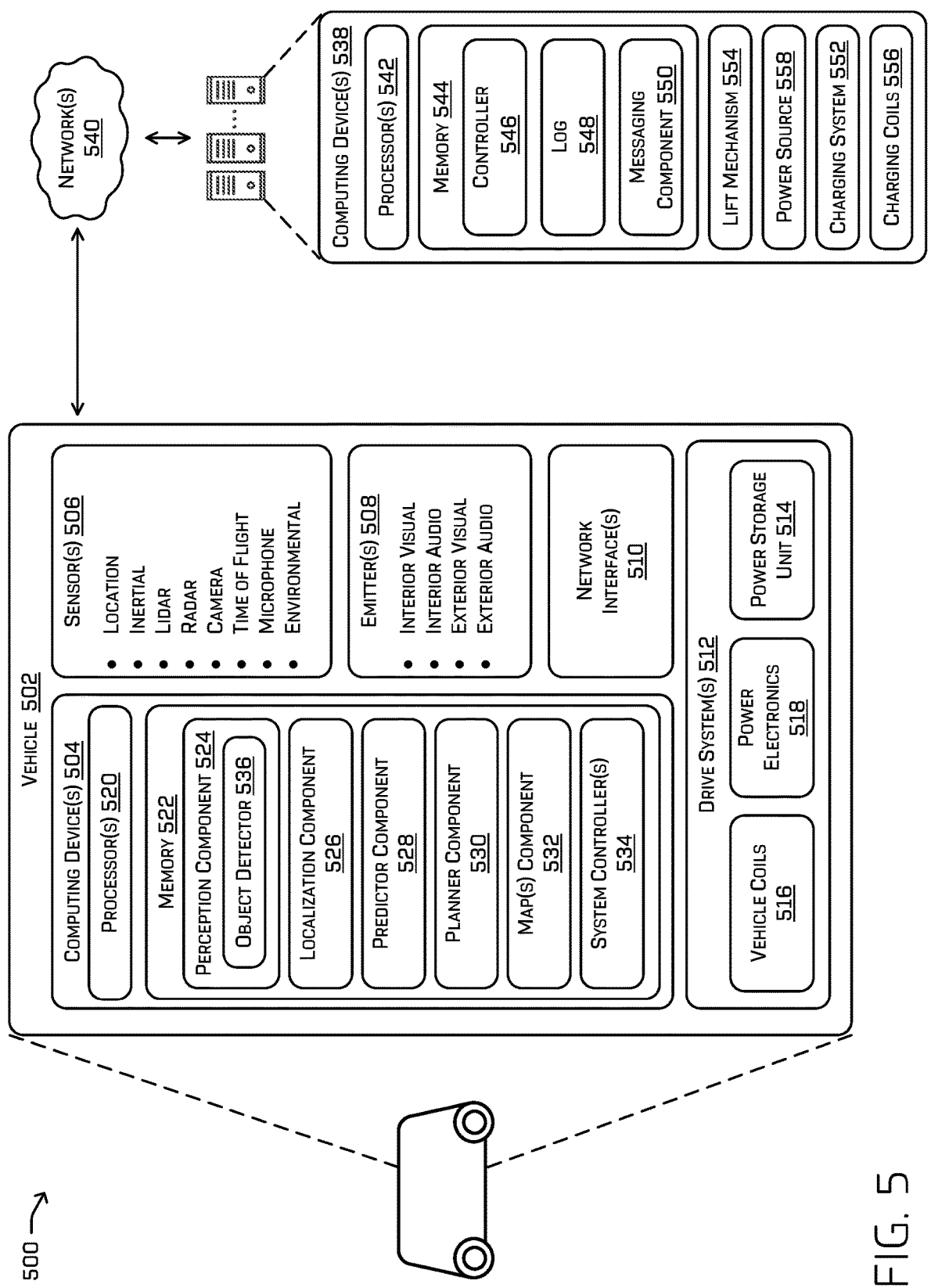
FIG. 5 illustrates a block diagram of an example system for implementing the techniques described herein, according to an example of the present disclosure.

FIG. 5 depicts a block diagram of an example architecture 500 for implementing the techniques discussed herein. In some instances, the architecture 500 may include a vehicle 502, which may represent the vehicle 102 introduced in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. Still, the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 may include one or more vehicle computing device(s) 504, one or more sensor(s) 506, one or more emitter(s) 508, one or more network interface(s) 510 (also referred to as communication devices and/or modems), and/or one or more drive system(s) 512. In some instances, the one or more sensor(s) 506 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor(s) 506 may include multiple instances of each of these or other types of sensors. For instance, the time-of-flight sensors may include individual time-of-flight sensors located at the corners, front, back, sides, and/or top of the vehicle 502. As another example, the camera sensors may include multiple cameras disposed at various locations about the exterior and/or interior of the vehicle 502. Similarly, the microphone sensors may include multiple microphones disposed at various locations about the exterior and/or interior of the vehicle 502. The one or more sensor(s) 506 may provide input to the vehicle computing device(s) 504.

The one or more emitter(s) 508 may emit light and/or sound. The one or more emitter(s) 508 in this example may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 may also include one or more network interface(s) 510 that enable communication between the vehicle 502 and one or more other local or remote computing device(s) (e.g., a remote teleoperation computing device) or remote services. For instance, the one or more network interface(s) 510 may facilitate communication with other local computing device(s) on the vehicle 502. Also, the one or more network interface(s) 510 may allow the vehicle 502 to communicate with other nearby computing device(s) (e.g., other nearby vehicles, traffic signals, controllers, etc.). The one or more network interface(s) 510 may include physical and/or logical interfaces for connecting the vehicle computing device(s) 504 to another computing device or one or more external networks (e.g., the Internet). For example, the one or more network interface(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

In at least one example, the vehicle 502 may include one or more drive system(s) 512. In some examples, the vehicle 502 may have a single drive system 512. In at least one example, the vehicle 502 may have multiple drive systems 512, where individual drive system(s) 512 may be positioned on opposite ends of the vehicle 502 (e.g., the front and the rear, etc.). In at least one example, the drive system(s) 512 may include the one or more sensor(s) 506 to detect conditions of the drive system(s) 512 and/or the surroundings of the vehicle 502. By way of example and not limitation, the sensor(s) 506 may include one or more wheel encoders (e.g., rotary encoders) to sense rotation of the wheels of the drive system(s) 512, inertial sensors (e.g., inertial measurement units, accelerometers, gyroscopes, magnetometers, etc.) to measure orientation and acceleration of the drive system(s) 512, cameras or other image sensors, ultrasonic sensors to acoustically detect objects in the surroundings of the drive system(s) 512, lidar sensors, radar sensors, etc. Some sensors, such as the wheel encoders may be unique to the drive system(s) 512. In some cases, the sensor(s) 506 on the drive system(s) 512 may overlap or supplement corresponding systems of the vehicle 502 (e.g., sensor(s) 506).

The drive system(s) 512 may include many of the vehicle systems, including a high voltage battery (e.g., power storage unit 514), vehicle coils 516 or multiple onboard coils (e.g., induction coil) for wirelessly charging the high voltage battery, a motor to propel the vehicle, a power electronics 518 to bi-directionally convert between DC and AC, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). The power storage unit 514 may be similar to the batteries 104 discussed above and/or the vehicle coils 516 may be similar to the vehicle coils 114.

Additionally, the drive system(s) 512 may include a drive system controller which may receive and preprocess data from the sensor(s) 506 and to control operation of the various vehicle systems. In some examples, the drive system controller may include one or more processor(s) and memory communicatively coupled with the one or more processor(s). The memory may store one or more components to perform various functionalities of the drive system(s) 512. Furthermore, the drive system(s) 512 also include one or more communication connection(s) that enable communication by the respective drive system with one or more other local or remote computing device(s).

The vehicle computing device(s) 504 may include one or more processor(s) 520 and memory 522 communicatively coupled with the one or more processor(s) 520. In the illustrated example, the memory 522 of the vehicle computing device(s) 504 may store a perception component 524, a localization component 526, a predictor component 528, a planner component 530, a map(s) component 532, and one or more system controller(s) 534. Though depicted as residing in the memory 522 for illustrative purposes, it is contemplated that the perception component 524, the localization component 526, the predictor component 528, the planner component 530, the map(s) component 532, and the one or more system controller(s) 534 may additionally, or alternatively, be accessible to the vehicle computing device(s) 504 (e.g., stored in a different component of vehicle 502) and/or be accessible to the vehicle 502 (e.g., stored remotely).

The perception component 524 may include functionality to perform object detection, segmentation, and/or classification. In some examples, the perception component 524 may include an object detector 536 that provides processed sensor data that indicates a presence of an entity that is proximate to the vehicle 502 and/or a classification of the entity as an entity type (e.g., car, pedestrian, cyclist, building, tree, road surface, curb, sidewalk, unknown, etc.).

In additional and/or alternative examples, the perception component 524 may provide processed sensor data that indicates one or more characteristics associated with a detected entity and/or the environment in which the entity is positioned. In some examples, characteristics associated with an entity may include, but are not limited to, an X-position (global position), a Y-position (global position), a Z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc. In general, the object detector 536 may detect (among other things) semantic objects represented by sensor data. In some examples, the object detector 536 may identify such semantic objects and may determine a two-dimensional or a three-dimensional bounding box associated with the object. The object detector 536 may determine additional information such as a location, orientation, pose, and/or size (e.g., length, width, height, etc.) associated with the object. The object detector 536 may send data to other components of the architecture 500 for localization and/or determining calibration information, as discussed herein.

Further, the perception component 524 may include functionality to store perception data generated by the perception component 524. In some instances, the perception component 524 may determine a track corresponding to an object that has been classified as an object type. For purposes of illustration only, the perception component 524, using the sensor(s) 506 may capture one or more images of an environment, which may be used to determine information about an environment. The stored perception data may, in some examples, include fused perception data captured by the vehicle 502. Fused perception data may include a fusion or other combination of sensor data from sensor(s) 506, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.). In this example, the vehicle computing device(s) 504 may determine a track corresponding to a pedestrian.

The localization component 526 may include functionality to receive data from the sensor(s) 506 and/or other components to determine a position of the vehicle 502. For example, the localization component 526 may include and/or request/receive a three-dimensional map of an environment and may continuously determine a location of the vehicle 502 within the map (e.g., determining a location in or near a charging depot). In some instances, the localization component 526 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the vehicle 502. In some instances, the localization component 526 may provide data to various components of the vehicle 502 to determine an initial position of an autonomous vehicle for generating a trajectory (e.g., to a vehicle charging space) or for initial calibration.

The predictor component 528 may generate one or more probability maps representing prediction probabilities of possible locations of one or more objects in an environment. For example, the predictor component 528 may generate one or more probability maps for vehicles, pedestrians, animals, and the like within a threshold distance from the vehicle 502. In some instances, the predictor component 528 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planner component 530 may determine a path for the vehicle 502 to follow to traverse through an environment (e.g., through a charging station). For example, the planner component 530 may determine various routes and paths and various levels of detail. In some instances, the planner component 530 may determine a route to travel from a first location (e.g., a current location) to a second location (e.g., a target location, such as a vehicle charging space). For the purpose of this discussion, a route may be a sequence of waypoints for traveling between two locations. As non-limiting examples, waypoints include streets, intersections, global positioning system (GPS) coordinates, etc. Further, the planner component 530 may generate an instruction for guiding the vehicle 502 along at least a portion of the route from the first location to the second location. In at least one example, the planner component 530 may determine how to guide the vehicle 502 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planner component 530 may alternatively, or additionally, use data from the perception component 524 and/or the predictor component 528 to determine a path for the vehicle 502 to follow to traverse through an environment. For example, the planner component 530 may receive data from the perception component 524 and/or the predictor component 528 regarding objects associated with an environment. Using this data, the planner component 530 may determine a route to travel from a first location (e.g., a current location) to a second location (e.g., a target location) to avoid objects in an environment. In at least some examples, the planner component 530 may determine there is no such collision free path and, in turn, provide a path which brings vehicle 502 to a safe stop avoiding all collisions and/or otherwise mitigating damage. The planner component 530 may also determine a path for the vehicle 502 at the charging station for aligning the vehicle coils 516 with charging coils. This may reduce an amount of actuation or adjustments to the charging coils to align with the vehicle coils 516. Example methods for aligning the vehicle are disclosed in U.S. patent application Ser. No. 17/364,213 and U.S. patent application Ser. No. 17/364,257, the entirety of which are herein incorporated by reference.

The memory 522 further includes the map(s) component 532 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. A map may further include an object identifier, an object classification, a three-dimensional location, covariance data (e.g., represented in image data or a multi-resolution voxel space), and the like. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the map(s) component 532 may include at least one map (e.g., images and/or a mesh). In some examples, the vehicle 502 may be controlled based at least in part on the map(s) component 532. That is, the map(s) component 532 may be used in connection with the perception component 524 (and sub-components), the localization component 526 (and sub-components), the predictor component 528, and/or the planner component 530 to determine a location of the vehicle 502, identify objects in an environment, generate prediction(s) and/or probabilities associated with objects and/or the vehicle 502, and/or generate routes and/or trajectories to navigate within an environment (e.g., a trajectory to navigate within a charging station to maneuver for charging).

In at least one example, the vehicle computing device(s) 504 include one or more system controller(s) 534, which may be configured to control steering, propulsion, braking, safety, emitters, communication, and other systems of the vehicle 502. The system controller(s) 534 may communicate with and/or control corresponding systems of the drive system(s) 512 and/or other components of the vehicle 502, which may be configured to operate in accordance with a path provided from the planner component 530.

The vehicle 502 may connect to computing device(s) 538 via a network 540. The computing device(s) 538 may include one or more processor(s) 542 and memory 544 communicatively coupled with the one or more processor(s) 542. In at least one instance, the one or more processor(s) 542 may be similar to the processor(s) 520 and the memory 544 may be similar to the memory 522. In some instances, the computing device(s) 538 may include a controller 546 (e.g., the controller 310). The controller 546 may communicatively couple to sensor(s) disposed at the charging station for controlling or otherwise instructing actuators to position charging coils into proximity with the vehicle coils 516. As part of this process, the controller 546 may receive sensor data capture by the sensor(s) 506 of the vehicle 502, and/or sensor(s) disposed at the charging station. For example, sensor(s) may capture (e.g., image) data associated with the vehicle 502 for use in determining a location of the vehicle coils 516. However, although shown as being located at the computing device(s) 538, the controller 546 may be a separate component from the computing device(s) 538 for controlling the actuator(s). In such instances, the controller may communicate with the computing device(s) 538 for determining whether and how to charge the vehicle 502.

In the illustrated example, the memory 544 of the computing device(s) 538 may store a log 548 and/or a messaging component 550. In at least one instance, the log 548 may perform operations for tracking usage and availability of charging stations in an environment. For example, the log 548 may track which charging stations are currently in use and which are available. In at least some other examples, the messaging component 550 may perform operations for transmitting messages to and/or receiving messages from vehicles or components of the lift mechanism (e.g., vehicle coils 516, power electronics, adapters, DC source, etc.). For example, the messaging component 550 may receive an indication associated with a charge level of the power storage unit 514. Depending on the charge, the controller 546 may transmit instructions to retract the lift mechanism and lower the charging coils (e.g., via the actuator(s)).

The processor(s) 520 of the vehicle computing device(s) 504 and the processor(s) 542 of the computing device(s) 538 may be any suitable processor capable of executing instructions to process data and perform operations as described herein. By way of example and not limitation, the processor(s) 520 and 542 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The computing device(s) 538 may also include, or be associated with, a charging system 552 that transfer(s) current to the vehicle 502. The charging system 552 may be similar to the charging system 106 as described above. For example, the charging system 552 may include a lift mechanism 554 for transitioning charging coils 556 between a retracted state and an extended state. The lift mechanism 554 may be similar to, or include similar components as, the lift mechanism 116 and/or the lift mechanism 300 described above. A power source 558 further couples to the charging coils 556 for inducing a current to the vehicle coils. Power electronics may further be included to bi-directionally convert between DC and AC. Still, in some instances, the computing device(s) 538 may include sensor(s), such as imaging device(s), that image the vehicle 502 for determining an amount of power to transmit to the vehicle 502, a rate at which the power is transmitted, and so forth. The sensor(s) may also determine a location of the vehicle coils 516 for use in aligning the charging coils 556. Moreover, in some instances, the localization component 526 may provide data to the charging system 552 for aligning the charging coils 556 with the vehicle coils 516 as the vehicle 502 approaches or enters the charging station. For example, by knowing the trajectory of vehicle 502, the charging system 552 may actuate the lift mechanism 554 to properly position the charging coils 556 in proximity to, or with, the vehicle coils 516.

The memory 522 of the vehicle computing device(s) 504 and the memory 544 of the computing device(s) 538 are examples of non-transitory computer-readable media. The memory 522 and 544 may store an operating system and one or more software applications, instructions, programs, and/or data to implement the methods described herein and the functions attributed to the various systems. In various implementations, the memory 522 and 544 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 522 and 544 may be implemented as a neural network. In some examples a machine learned model could be trained for object detection (e.g., a vehicle detecting objects or components of the charging station) or trajectory planning for aligning the charging coils and the vehicle coils 516.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

As described above with reference to FIGS. 1-4, techniques described herein may be useful for recharging batteries of an electric vehicle. In some instances, wireless charging may be more convenient than conventional physical-contact charging systems and may reduce maintenance associated with wear of the physical contacts. In addition, wirelessly charging may be performed using a plurality of charging coils. The charging coils and the vehicle coils may be spaced apart (e.g., vertically, laterally, and/or longitudinally offset) by different amounts, such that, when the vehicle is positioned in the charging station, a left mechanism may raise the charging coils into proximity with the vehicle coils. In some instances, actuator(s) may align the charging coils and the vehicle coils to account of misalignment (e.g., the charging coils and the vehicle coils are not centered).

Figure 6:
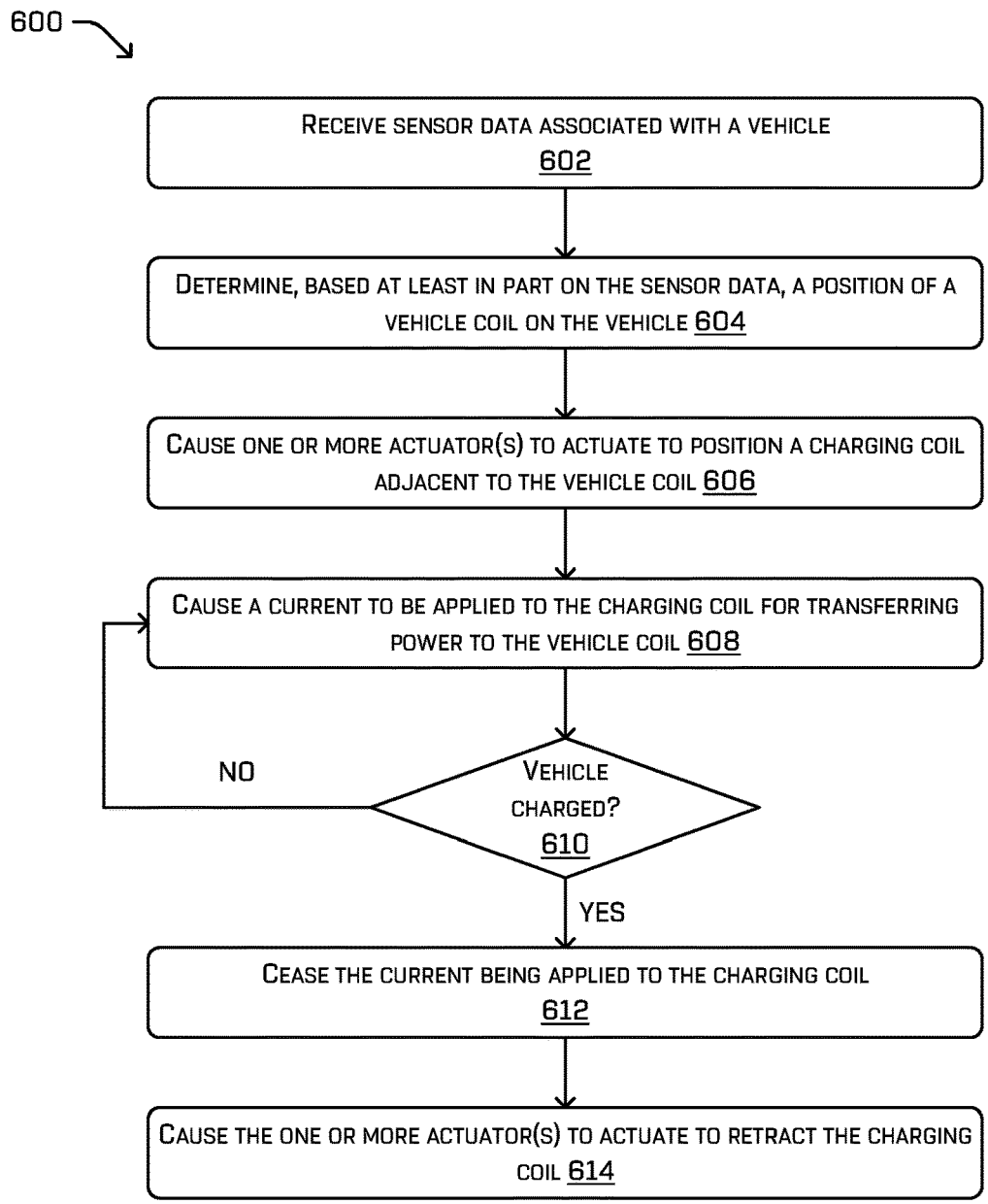
FIG. 6 illustrates an example process for charging a battery of a vehicle, according to an example of the present disclosure.

FIG. 6 illustrates an example process 600 for positioning a charging coil relative to a vehicle coil. The process 600 described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process 600, or alternative processes, and not all of the blocks need be executed. For discussion purposes, the process 600 is described with reference to the environments, architectures and systems described in the examples herein, such as, for example those described with respect to FIGS. 1-4, although the process 600 may be implemented in a wide variety of other environments, architectures and systems. In some instances, the process 600 may be performed by a controller communicatively coupled to a lift mechanism having one or more actuators and/or a charging system configured to charge batteries of a vehicle.

At 602, the process 600 may include receiving sensor data associated with a vehicle. For example, sensor(s) disposed at a charging station may capture sensor data associated with the vehicle. Example sensor(s) include proximity sensor(s), imaging sensor(s), lidar sensor(s), radar sensor(s), RFID, NFC, wireless signals, and so forth. As discussed in detail herein, the sensor data generated by the sensor(s) may be used to determine characteristic(s) of the vehicle, such as location, geometries, size, wheel base, and so forth, as well as characteristic(s) of the vehicle coils onboard the vehicle, such as a location of the vehicle coils. The sensor(s) may be disposed about the charging station either on a drivable surface, above the drivable surface, and/or in the drivable surface. Moreover, in some instances, the sensor(s) may be configured to image marker(s) on the vehicle for identifying the characteristic(s) of the vehicle and/or the vehicle coils. However, the sensor(s) may be configured to image portions of the vehicle (e.g., side, undercarriage, front, etc.) and/or other identifier(s) (e.g., make/model, emblem, license plate, etc.) for identifying the characteristic(s) of the vehicle and/or the vehicle coils. In various examples, such marker(s) need not be apparent in the visible spectrum (e.g., may be in infrared, ultraviolet, etc.) and/or detected using one or more additional sensing modalities (e.g., lidar, radar, ultrasonics, etc.).

At 604, the process 600 may include determining, based at least in part on the sensor data, a position of a vehicle coil on the vehicle. For example, the controller may process the sensor data to determine a location of the vehicle coils on the vehicle. In some instances, the sensor data may indicate a make/model of the vehicle and/or a ground clearance of the vehicle, which may be used by the controller to identify the vehicle and hence the location of the vehicle coils. Noted above, in some instances, the sensor data may be representative of marker(s) disposed on the vehicle. Here, the marker(s) may represent fiducials that are analyzed to determine the position of the vehicle and/or vehicle coils. Still, in some instances, the marker(s) may represent barcodes, QR codes, or other identifiers associated with the vehicle. The marker(s) may be analyzed for determining make, model, and so forth for knowing the location of the vehicle coils. Knowing the location of the vehicle coil allows the charging coils to be positioned proximate the vehicle coils for transferring power to the vehicle.

At 606, the process 600 may include causing one or more actuator(s) to actuate to position a charging coil adjacent to the vehicle coil. For example, as part of determining the position of the vehicle coil, the controller may cause one or more actuator(s) to actuate for adjusting the position of the charging coil. In some instances, the actuator(s) may actuate longitudinally, vertically, and/or laterally for adjusting an orientation of the charging coils. Actuation of the actuator(s) may be specific to the vehicle being charged for properly aligning the charging coils and the vehicle coils. In some instances, actuating the one or more actuators may bring the charging coils to within a certain distance (e.g., within 100 mm-200 mm) for transferring power to the vehicle.

In some instances, the process 600 may continuously receive sensor data for use in making adjustments to the actuators for positioning the charging coils. For example, the vehicle may shift during charging and the actuators may continuously align the charging coils and the vehicle coils.

At 608, the process 600 may include causing a current to be applied to the charging coil for transferring power to the vehicle. For example, a power source may supply AC to the charging coil such that the vehicle is inductively charged (e.g., via the induction from the charging coil to the vehicle coil). In some instances, the amount of AC supplied may be based at least in part on a charge level of batteries on the vehicle. As the vehicle coils receive the AC, the vehicle may include power components that convert the AC into DC. The DC may then be transmitted to batteries for power storage. In some instances, the process 600 may be capable of indicatively charging the vehicle within a range between about 40 kW to about 60 kW. Alternatively, in those examples in which contact charging is used, a direct current may be applied which is optimized for charging of batteries onboard the vehicle.

At 610, the process 600 may include determining whether the vehicle is charged. In some instances, determining whether the vehicle is charged may be determined at least in part by receiving indications from a vehicle, or computing device(s) of the vehicle, associated with a charging state of the batteries. For example, the indication may indicate whether the batteries are fully charged (e.g., 100%) and/or partially charged (e.g., 50%, 75%, etc.). In some instances, the batteries may be fully charged before charging is ceased, or the batteries may be charged to a certain threshold (e.g., sufficient to complete a trip). The process 600 may compare a battery level with the threshold for determining whether the vehicle is charged. Additionally or alternatively, an indication that the vehicle is charged may be received for knowing that the vehicle is charged. If at 610 the process 600 determines that the vehicle is not charged, the process 600 may follow the "NO" route and loop to 608. Therein, the power source may continue to charge the vehicle. If, however, the process 600 determines that the vehicle is charged, the process 600 may follow the "YES" route and proceed to 612. In at least some examples, process may additionally or alternatively proceed to 612 in the event that the vehicle is detected to have moved off of the charging platform (either by the one or more sensor(s), change in impedance measured of the coil, or the like).

At 612, the process 600 may include ceasing the current to be applied to the charging coil. For example, as a result of the vehicle being charged, the power source may cease supplying the current to the vehicle. In some instances, rather than ceasing the current, a lesser amount of current may be applied.

At 614, the process 600 may include causing the one or more actuators to actuate to retract the charging coil. For example, the controller may transmit instructions to the actuator(s) for retracting the charging coil. Such retracting may avoid damage to the vehicle and/or the charging coil as the vehicle exits the charging station. As above, in various examples such actuation (both here in 614 and as above) may be performed passively and/or actively.

Although the discussion is with regard to wirelessly transferring power to the vehicle, in some instances, charging the vehicle may come by way of physical contact-based charging. Here, the sensors may determine a location of a charging port on the vehicle and the actuator(s) may actuate to align a charger with the charging port. Example physical contact-based charging techniques are discussed in U.S. Pat. No. 11,034,254, issued Jun. 15, 2021, the entirety of which is herein incorporated by reference. Furthermore, the process 600 illustrates a charging of a single vehicle, however, it is to be understood that process 600 may be scaled for charging a plurality of vehicles (e.g., fleet). For example, an environment may include multiple charging stations, and each charging station may include components capable of charging respective vehicles located at the charging station.

Example Clauses

The following paragraphs describe various examples. Any of the examples in this section may be used with any other of the examples in this section and/or any of the other examples or embodiments described herein.

A: A system for charging a vehicle, the system comprising a power source; a charging coil electrically connected to the power source; and a lift mechanism coupled to the charging coil, the lift mechanism being configured to transition between an extended state in which the charging coil is disposed in a first position proximate a vehicle coil of a vehicle to permit charging of the vehicle, and a retracted state in which the charging coil is disposed in a second position spaced from the vehicle, the lift mechanism including: a plate for receiving a wheel of the vehicle, a lever arm coupled to the plate, and a fulcrum about which the lever arm is configured to pivot for transitioning the lift mechanism between the extended state based at least in part on the wheel being positioned on the plate and the retracted state based at least in part on the wheel being removed from the plate.

B: The system of paragraph A, wherein the plate is disposed in or on a surface on which the vehicle traverses; in the retracted state, the charging coil is disposed on, flush with, or recessed below the surface on which the vehicle traverses; and in the extended state, the charging coil is spaced above the surface on which the vehicle traverses.

C: The system of paragraph A or B, further comprising an actuator coupled to the fulcrum, wherein actuation of the actuator is configured to adjust a position of the fulcrum along a length of the lever arm.

D: The system of any of paragraphs A-C, further comprising one or more sensors arranged to capture sensor data indicating one of a location of the charging coil or a location of a vehicle coil, wherein a position of the charging coil in the extended state is based at least in part on the at least one of the location of the charging coil or the location of the vehicle coil.

E: The system of any of paragraphs A-D, further comprising at least one of: a spring coupled to the lift mechanism to bias the lift mechanism toward either the extended state or the retracted state; a dampener coupled to the lift mechanism to damp a motion of the lift mechanism; or a locking mechanism to lock the lift mechanism in at least one of the extended state or the retracted state.

F: A system comprising a power source; a charging element electrically coupled to the power source; and a lift mechanism configured to translate the charging element from a first position relative to a vehicle charging element to a second position relative to the vehicle charging element, wherein the vehicle charging element is located on a vehicle, the second position is closer to the vehicle charging element than the first position, and the second position is based at least in part on a position of the vehicle.

G: The system of paragraph F, wherein the lift mechanism comprises a plate configured to receive a wheel of the vehicle, and a lever arm coupled to the plate, the lever arm configured to transmit a force applied to the plate by the wheel to the charging element to translate the charging element from the first position to the second position.

H: The system of paragraph F or G, further comprising a sensor to sense a position of the vehicle; and a controller communicatively coupled to the lift mechanism, the controller configured to: receive sensor data from the sensor; and align, based at least in part on the sensor data, the charging element with the vehicle charging element.

I: The system of any of paragraphs F-H, wherein the sensor data represents at least one of: the position of the vehicle; a make of the vehicle; a model of the vehicle; a weight of the vehicle; or a ground clearance of the vehicle.

J: The system of any of paragraphs F-I, wherein the second position is further based at least in part on at least one of: the make of the vehicle; the model of the vehicle; the weight of the vehicle; a size of the vehicle charging element; or the ground clearance of the vehicle.

K: The system of any of paragraphs F-J, further comprising a controller communicatively coupled to the lift mechanism, the controller configured to: receive an indication associated with the vehicle being charged; and translate, based at least in part on the indication, the lift mechanism from the second position to the first position.

L: The system of any of paragraphs F-K, wherein the lift mechanism comprises an actuator that is adjustable in length for transitioning the lift mechanism between first position and the second position; and the actuator comprises at least one of a first actuator, a second actuator, or a third actuator; the first actuator adjusts a position of the charging element in a first direction; the second actuator adjusts the position of the charging element in a second direction that is different than the first direction; and the third actuator adjusts the position of the charging element in a third direction that is different than the second direction.

M: The system of any of paragraphs F-L, wherein the charging element comprises a first charging coil; and the vehicle charging element comprises a second charging coil.

N: A system comprising a charging element; and a lift mechanism coupled to the charging element, the lift mechanism being actuatable from a first position to a second position to bring the charging element to within a charging distance for transferring current between the charging element and a vehicle charging element located onboard a vehicle, the second position being based at least in part on a characteristic associated with the vehicle.

O: The system of paragraph N, wherein the lift mechanism comprises one or more actuators that are adjustable for transitioning the lift mechanism between the first position and the second position.

P: The system of paragraph N or O, wherein the lift mechanism comprises a plate configured to receive a wheel of the vehicle, and a lever arm coupled to the plate; the lift mechanism transitions to the second position based at least in part on the wheel of the vehicle being positioned on the plate; and the lift mechanism transitions to the first position based at least in part on the wheel being absent from the plate.

Q: The system of any of paragraphs N-P, further comprising one or more processors; and one or more non-transitory computer-readable media storing instructions executable by the one or more processors, wherein the instructions, when executed, cause the one or more processors to perform acts comprising receiving an indication associated with the vehicle arriving at a charging station for charging the vehicle; and causing the lift mechanism to actuate from the first position to the second position.

R: The system of any of paragraphs N-Q, further comprising one or more sensors, the acts further comprising receiving, from the one or more sensors, sensor data; and determining, based at least in part on the sensor data, the characteristic of the vehicle.

S: The system of any of paragraphs N-R, wherein the characteristic comprises a make of the vehicle; a model of the vehicle; a weight of the vehicle; a size of the vehicle charging element; a ground clearance of the vehicle; or a location of the vehicle charging element on the vehicle.

T: The system of any of paragraphs N-S, wherein the charging element comprises a first charging coil; and the vehicle charging element comprises a second charging coil.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system for charging a vehicle, the system comprising:
   a power source;
   a charging coil electrically connected to the power source; and
   a lift mechanism coupled to the charging coil, the lift mechanism being configured to transition between an extended state in which the charging coil is disposed in a first position proximate a vehicle coil of the vehicle to permit charging of the vehicle, and a retracted state in which the charging coil is disposed in a second position spaced from the vehicle, the lift mechanism including:
      a plate for receiving a wheel of the vehicle,
      a lever arm coupled to the plate,
      a fulcrum about which the lever arm is configured to pivot for transitioning the lift mechanism between the extended state based at least in part on the wheel being positioned on the plate and the retracted state based at least in part on the wheel being removed from the plate, and
      an actuator coupled to the fulcrum, the actuator being configured to adjust, based at least in part on a characteristic of the vehicle, a position of the fulcrum along a length of the lever arm.

2. The system of claim 1, wherein:
   the plate is disposed in or on a surface on which the vehicle traverses;
   in the retracted state, the charging coil is disposed on, flush with, or recessed below the surface on which the vehicle traverses; and
   in the extended state, the charging coil is spaced above the surface on which the vehicle traverses.

3. The system of claim 1, further comprising one or more sensors arranged to capture sensor data indicating one of a location of the charging coil or a location of a vehicle coil, wherein a position of the charging coil in the extended state is based at least in part on the at least one of the location of the charging coil or the location of the vehicle coil.

4. The system of claim 1, further comprising at least one of:
   a spring coupled to the lift mechanism to bias the lift mechanism toward either the extended state or the retracted state;
   a dampener coupled to the lift mechanism to damp a motion of the lift mechanism; or
   a locking mechanism to lock the lift mechanism in at least one of the extended state or the retracted state.

5. A system comprising:
   a power source;
   a charging element electrically coupled to the power source;
   a lift mechanism configured to translate the charging element from a first position relative to a vehicle charging element to a second position relative to the vehicle charging element, wherein the vehicle charging element is located on a vehicle, the lift mechanism including a fulcrum, a lever arm, and an actuator;
   a sensor configured to image one or more markers on the vehicle; and
   a controller communicatively coupled to the lift mechanism and the sensor, the controller configured to:
      receive sensor data from the sensor,
      determine a height by which to raise the charging element from the first position to the second position, the second position being closer to the vehicle charging element than the first position, and
      cause the actuator to adjust a position of the fulcrum along the lever arm to raise the charging element by the height.

6. The system of claim 5, wherein:
   the lift mechanism comprises a plate configured to receive a wheel of the vehicle; and
   the lever arm is coupled to the plate, the lever arm configured to transmit a force applied to the plate by the wheel to the charging element to translate the charging element from the first position to the second position.

7. The system of claim 5, wherein the controller is configured to align, based at least in part on the sensor data, the charging element with the vehicle charging element.

8. The system of claim 5, wherein the sensor data represents at least one of:
   a position of the vehicle;
   a make of the vehicle;
   a model of the vehicle;
   a weight of the vehicle; or
   a ground clearance of the vehicle.

9. The system of claim 8, wherein the second position is further based at least in part on at least one of:
   the make of the vehicle;
   the model of the vehicle;
   the weight of the vehicle;
   a size of the vehicle charging element; or
   the ground clearance of the vehicle.

10. The system of claim 5, wherein the controller is configured to:
    receive an indication associated with the vehicle being charged; and translate, based at least in part on the indication, the lift mechanism from the second position to the first position.

11. The system of claim 5, further comprising:
a second actuator that adjusts a position of the charging element in a first direction relative to the vehicle; and
a third actuator that adjusts the position of the charging element in a second direction relative to the vehicle, the second direction being different than the first direction.

12. The system of claim 5, wherein:
the charging element comprises a first charging coil; and
the vehicle charging element comprises a second charging coil.

13. A system comprising:
a charging element;
a lift mechanism coupled to the charging element, the lift mechanism being configured to transition from a first position to a second position to bring the charging element to within a charging distance for transferring current between the charging element and a vehicle charging element located onboard a vehicle, the second position being based at least in part on a characteristic associated with the vehicle, the lift mechanism including:
  a lever arm, and
  a fulcrum about which the lever arm pivots, the fulcrum being adjustable along a length of the lever arm to bring the charging element to within the charging distance; and
a bumper coupled to the lift mechanism, the bumper being configured to at least partially align the charging element with the vehicle charging element based at least in part on a wheel of the vehicle engaging the bumper.

14. The system of claim 13, wherein the lift mechanism comprises one or more actuators that are adjustable for transitioning the lift mechanism between the first position and the second position.

15. The system of claim 13, wherein:
the lift mechanism comprises a plate configured to receive the wheel of the vehicle;
the lever arm couples to the plate;
the lift mechanism transitions to the second position based at least in part on the wheel of the vehicle being positioned on the plate; and
the lift mechanism transitions to the first position based at least in part on the wheel being absent from the plate.

16. The system of claim 13, further comprising:
one or more processors; and
one or more non-transitory computer-readable media storing instructions executable by the one or more processors, wherein the instructions, when executed, cause the one or more processors to perform acts comprising:
  receiving an indication associated with the vehicle arriving at a charging station for charging the vehicle; and
  causing the lift mechanism to actuate from the first position to the second position.

17. The system of claim 16, further comprising one or more sensors, the acts further comprising:
receiving, from the one or more sensors, sensor data; and
determining, based at least in part on the sensor data, the characteristic of the vehicle.

18. The system of claim 17, wherein the characteristic comprises:
a make of the vehicle;
a model of the vehicle;
a weight of the vehicle;
a size of the vehicle charging element;
a ground clearance of the vehicle; or
a location of the vehicle charging element on the vehicle.

19. The system of claim 13, wherein:
the charging element comprises a first charging coil; and
the vehicle charging element comprises a second charging coil.

20. The system of claim 13, wherein:
the bumper is configured to move the charging element in a first direction relative to the vehicle; and
the lift mechanism is configured to move the charging element in a second direction relative to the vehicle, the second direction being transverse to the first direction.

* * * * *